(12) United States Patent
Suzuki et al.

(10) Patent No.: US 9,507,624 B2
(45) Date of Patent: Nov. 29, 2016

(54) NOTIFICATION CONVERSION PROGRAM AND NOTIFICATION CONVERSION METHOD

(71) Applicant: FUJITSU LIMITED, Kawasaki-shi, Kanagawa (JP)

(72) Inventors: Kazuhiro Suzuki, Kawasaki (JP); Soichi Shigeta, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/753,473

(22) Filed: Jun. 29, 2015

(65) Prior Publication Data
US 2016/0004548 A1 Jan. 7, 2016

(30) Foreign Application Priority Data
Jul. 7, 2014 (JP) ................................ 2014-139313

(51) Int. Cl.
*G06F 9/455* (2006.01)
*G06F 9/54* (2006.01)

(52) U.S. Cl.
CPC ............. *G06F 9/45558* (2013.01); *G06F 9/54* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 8,364,802 B1* | 1/2013 | Keagy | ..................... | G06F 8/63 709/223 |
| 8,380,853 B2* | 2/2013 | Kudo | ..................... | G06F 9/5044 707/609 |
| 8,539,484 B1* | 9/2013 | Offer | ................................ | 718/1 |
| 8,732,698 B2* | 5/2014 | Ling | ..................... | G06F 9/45558 718/1 |
| 9,256,464 B2* | 2/2016 | Jamjoom | ............. | G06F 9/45533 |
| 9,280,378 B2* | 3/2016 | Shah | ................... | G06F 9/45558 |
| 9,396,016 B1* | 7/2016 | Marquardt | .......... | G06F 9/45558 |
| 2010/0037296 A1* | 2/2010 | Silverstone | ........... | G06F 21/445 726/3 |
| 2010/0332890 A1* | 12/2010 | Chen | ..................... | G06F 9/5077 714/2 |
| 2011/0153909 A1 | 6/2011 | Dong | | |
| 2012/0254865 A1* | 10/2012 | Saeki | .................. | G06F 9/45533 718/1 |
| 2013/0139154 A1* | 5/2013 | Shah | .................... | G06F 9/45558 718/1 |
| 2013/0139155 A1* | 5/2013 | Shah | .................... | G06F 9/45558 718/1 |
| 2013/0145363 A1* | 6/2013 | Eidus | ................... | G06F 9/45541 718/1 |
| 2013/0239108 A1* | 9/2013 | Lee | ..................... | G06F 9/45558 718/1 |
| 2013/0318595 A1* | 11/2013 | Wang | .................. | G06F 9/45558 726/16 |
| 2013/0326516 A1* | 12/2013 | Hill | ..................... | G06F 9/45533 718/1 |
| 2014/0325036 A1* | 10/2014 | Jahanbanifar | ......... | G06F 9/5077 709/220 |
| 2014/0359619 A1* | 12/2014 | Park | .................... | G06F 9/45558 718/1 |

(Continued)

FOREIGN PATENT DOCUMENTS

| | | |
|---|---|---|
| JP | 2010-039685 | 2/2010 |
| JP | 2011-134320 | 7/2011 |

*Primary Examiner* — Hiren Patel
(74) *Attorney, Agent, or Firm* — Fujitsu Patent Center

(57) ABSTRACT

A non-transitory computer-readable storage medium storing a notification conversion program causing a computer to execute a process includes determining, in response to acquisition of a first notification transmitted from a first virtual machine, a type of first management software capable of executing the first notification by referring to a first storage unit storing therein first information in which a notification transmitted from a virtual machine and a type of management software capable of executing a notification transmitted from a virtual machine are associated with each other, converting the first notification into a second notification executable by second management software that has acquired the first notification, based on the determined type of the first management software; and executing the second notification obtained by the conversion.

6 Claims, 20 Drawing Sheets

(56) References Cited

U.S. PATENT DOCUMENTS

| | | | |
|---|---|---|---|
| 2014/0380314 A1* | 12/2014 | Shimada | G06F 9/4856 718/1 |
| 2015/0007170 A1* | 1/2015 | Tsirkin | G06F 9/45533 718/1 |
| 2015/0058382 A1* | 2/2015 | St. Laurent | G06F 17/30076 707/823 |
| 2015/0324217 A1* | 11/2015 | Shilmover | G06F 9/45558 718/1 |
| 2015/0378769 A1* | 12/2015 | Buck | G06F 9/45558 718/1 |

* cited by examiner

FIG. 5
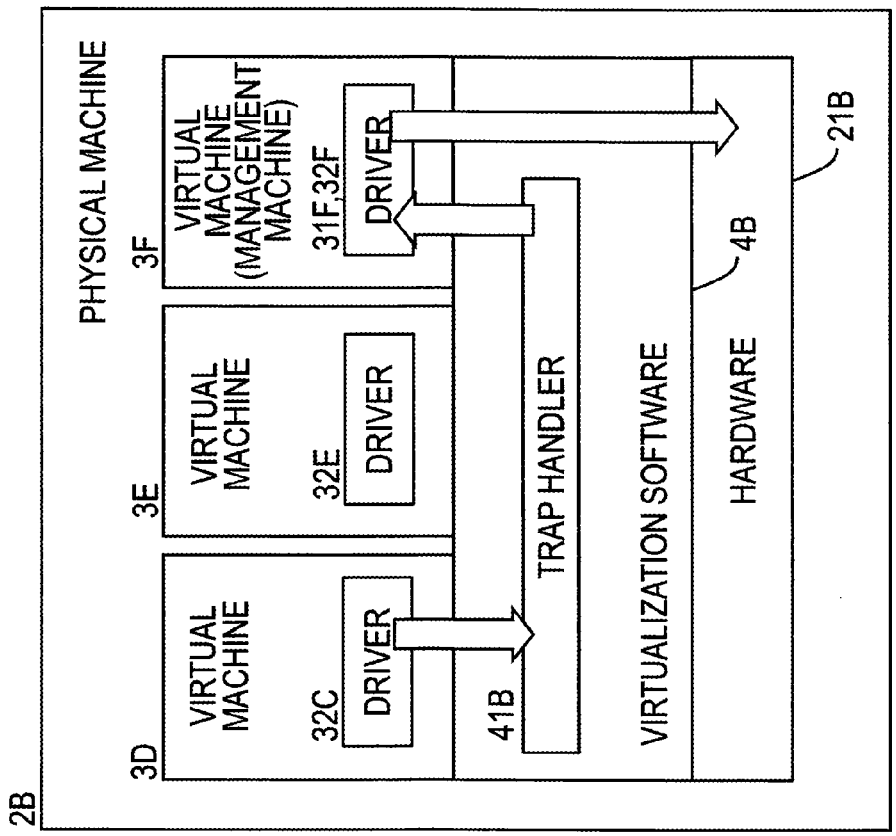
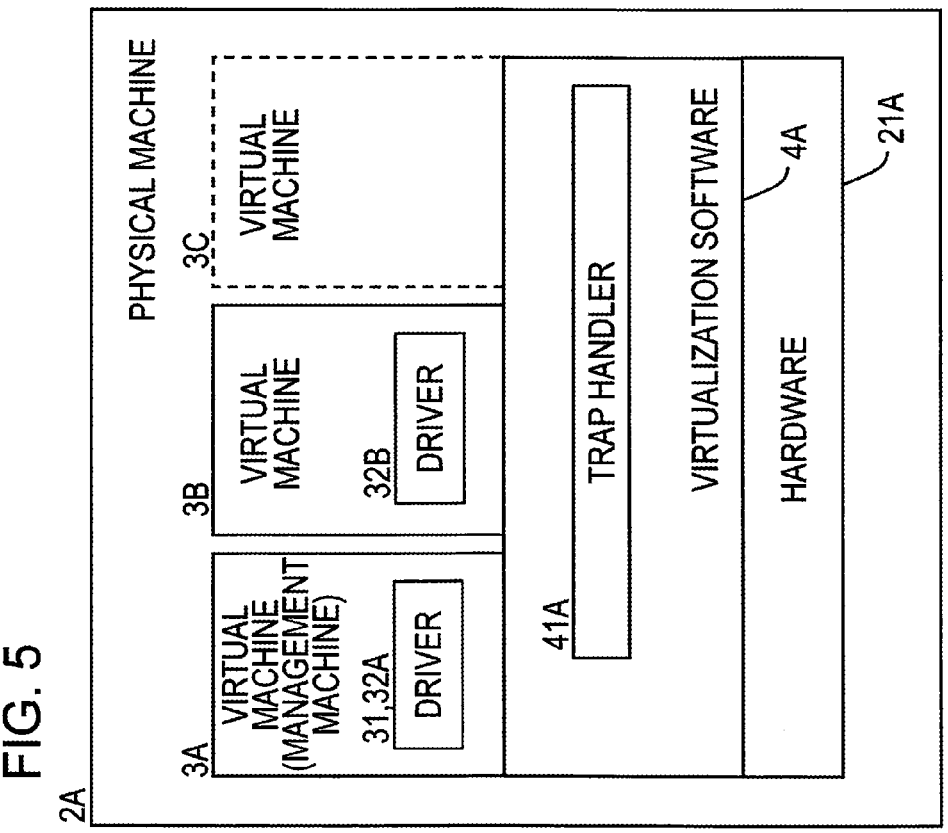

FIG. 6
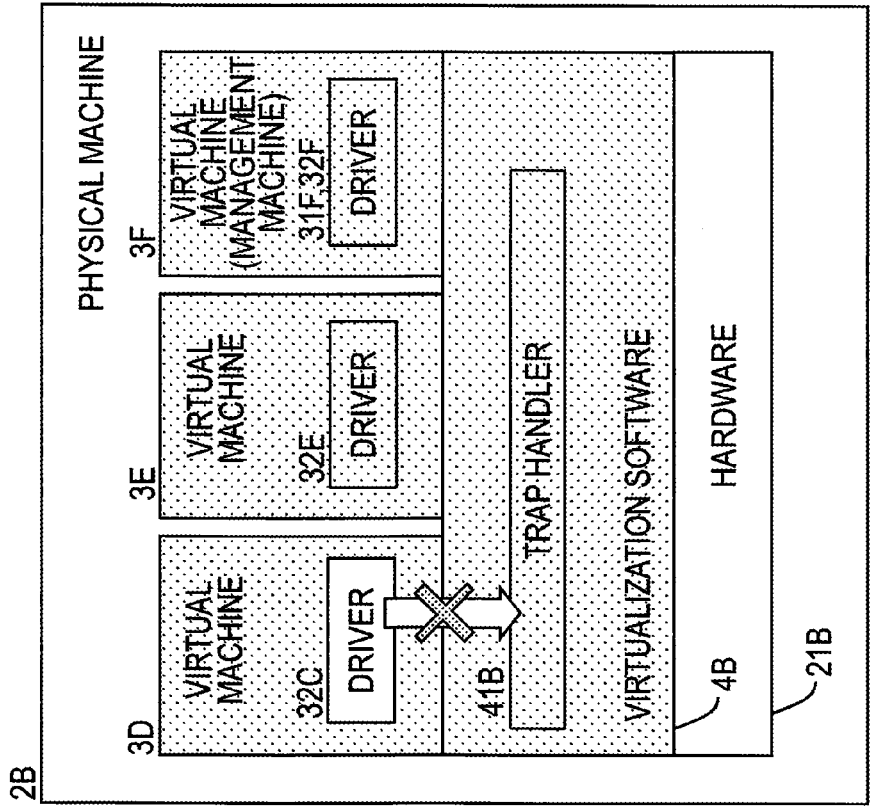
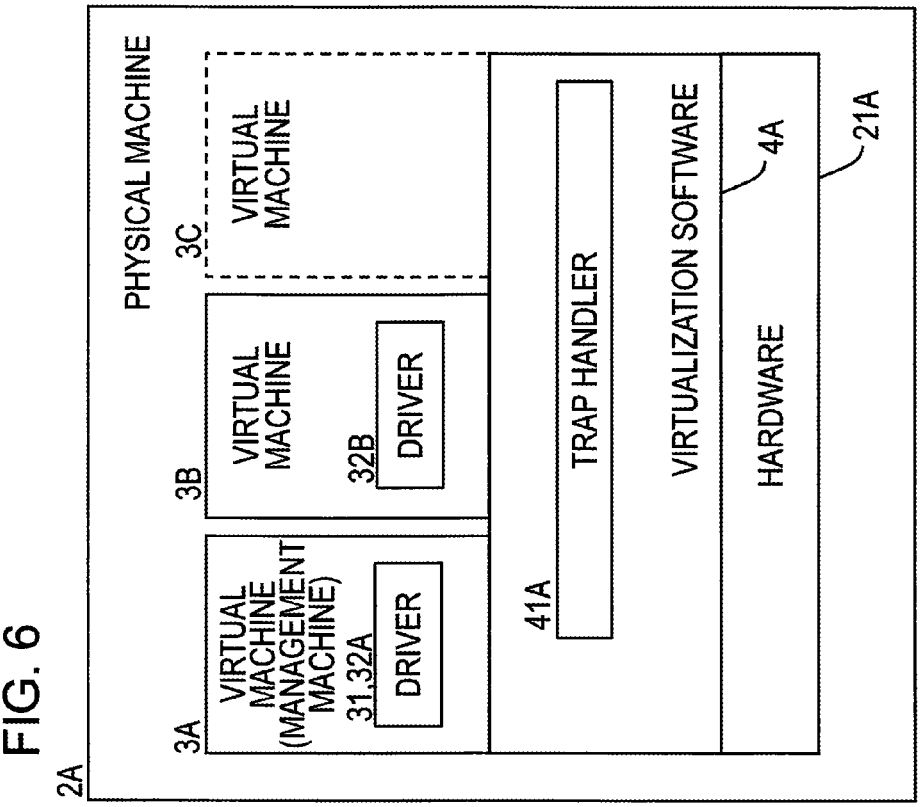

FIG. 13

TYPE MANAGEMENT INFORMATION

| HYPERCALL | TYPE |
|---|---|
| AAA COMMAND | HV-A |
| BBB COMMAND | HV-B |
| CCC COMMAND | HV-C |

FIG. 14

TYPE CONVERSION INFORMATION

| TYPE | HYPERCALL1 | HYPERCALL2 | HYPERCALL3 |
|---|---|---|---|
| HV-A | A1 | A2 | A3 |
| HV-B | B1 | B2 | B3 |
| HV-C | C1 | C2 | C3 |

FIG. 16

TYPE MANAGEMENT INFORMATION

| HYPERCALL | TYPE | TRANSMISSION DESTINATION |
|---|---|---|
| AAA COMMAND | HV-A | TYPE CONVERTING UNIT 213A |
| BBB COMMAND | HV-B | TYPE CONVERTING UNIT 213B |
| CCC COMMAND | HV-C | TYPE CONVERTING UNIT 213C |

FIG. 19

VIRTUAL MACHINE MANAGEMENT INFORMATION

| ID | NUMBER OF CPUs | MEMORY CAPACITY (GB) | DISK CAPACITY (GB) | TYPE |
|---|---|---|---|---|
| 1 | 2 | 1 | 10 | HV-B |
| 2 | 2 | 2 | 10 | - |
| 3 | 1 | 1 | 20 | HV-A |

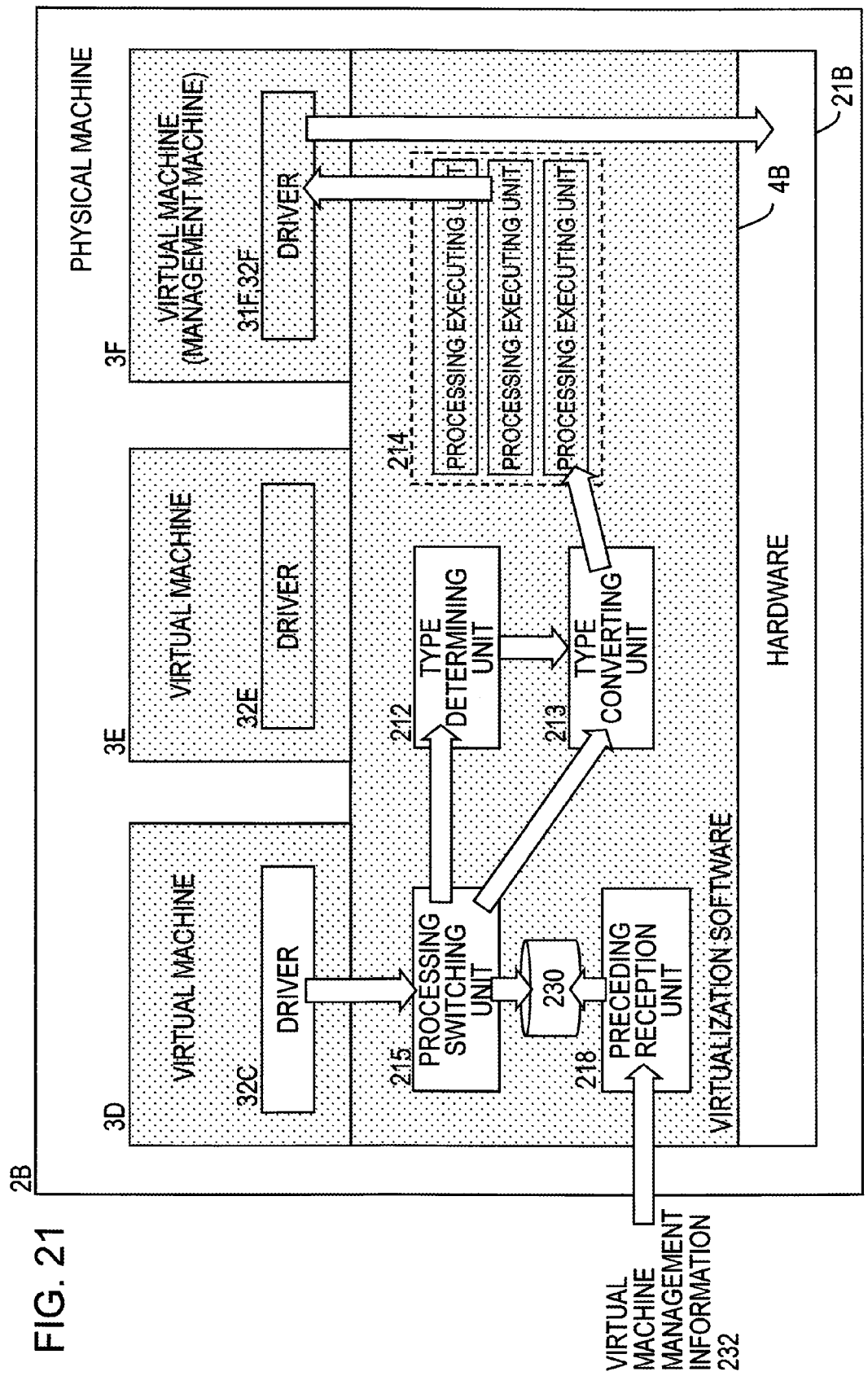

NOTIFICATION CONVERSION PROGRAM AND NOTIFICATION CONVERSION METHOD

CROSS-REFERENCE TO RELATED APPLICATION

This application is based upon and claims the benefit of priority of the prior Japanese Patent Application No. 2014-139313, filed on Jul. 7, 2014, the entire contents of which are incorporated herein by reference.

FIELD

The present invention relates to a notification conversion program and a notification conversion method.

BACKGROUND

Due to recent improvement of the performance of physical devices (hereinafter, also referred to as physical machines), study has been undertaken on a virtualization technique of aggregating a plurality of virtual devices (hereinafter, also referred to as virtual machines) into a single physical machine study. The virtualization technique enables a service to be provided from an application program (hereinafter, also referred to as an application) installed in each virtual machine, with the physical machines being allocated to a plurality of virtual machines by virtualization software (hypervisor) for example.

In a virtual machine which is under operation, migration of a content (hereinafter, referred to as a disk image) constituting a virtual machine to a virtual machine that is generated in another physical machine may be performed. A service provider using the virtual machine (hereinafter, also simply referred to as a service provider) performs the migration to migrate the disk image in the virtual machine generated in the physical machine with the CPU use rate close to 100% to another physical machine with lower CPU use rate, for example. Thus, the provider can balance processing loads among the physical machines (see, for example, Japanese Patent Application Publication No. 2010-39685 and Japanese Patent Application Publication No. 2011-134320).

SUMMARY

In the migration described above, depending on the content of the service provided by the virtual machine, the service needs to be provided without interruption (hereinafter, referred to as live migration). In the live migration, for example, the migration is executed without restarting the virtual machine, whereby the provision of the service is prevented from being interrupted while the migration is in process.

Hypervisors of, for example, different types, which manage the virtual machine, have different virtual hardware configurations. Thus, the types of software, such as a driver, read by the virtual machine under management might differ. In this case, for example, when the migration is performed between the physical machines on which different types of hypervisors operate, the migrated virtual machine needs to be restarted. Then, the virtual machine reads the driver and the like used for operating under the management of the hypervisor after the migration. All things considered, the live migration might not be able to be performed between the physical machines on which the different types of hypervisors operate.

According to an aspect of the embodiments, a non-transitory computer-readable storage medium storing a notification conversion program causing a computer to execute a process includes determining, in response to acquisition of a first notification transmitted from a first virtual machine, a type of first management software capable of executing the first notification by referring to a first storage unit storing therein first information in which a notification transmitted from a virtual machine and a type of management software capable of executing a notification transmitted from a virtual machine are associated with each other, converting the first notification into a second notification executable by second management software that has acquired the first notification, based on the determined type of the first management software, and executing the second notification obtained by the conversion.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 4 to 6 are diagrams illustrating the migration of a virtual machine.

FIGS. 12 to 14 are diagrams illustrating the detail of the notification conversion processing in the first embodiment.

FIG. 15 and FIG. 16 are diagrams illustrating the notification conversion processing in the first embodiment.

FIG. 18 and FIG. 19 are diagrams illustrating the notification conversion processing in the second embodiment.

FIG. 21 is a diagram illustrating the notification conversion processing in the third embodiment.

DESCRIPTION OF EMBODIMENTS

[Configuration of Information Processing System]

Figure 1:
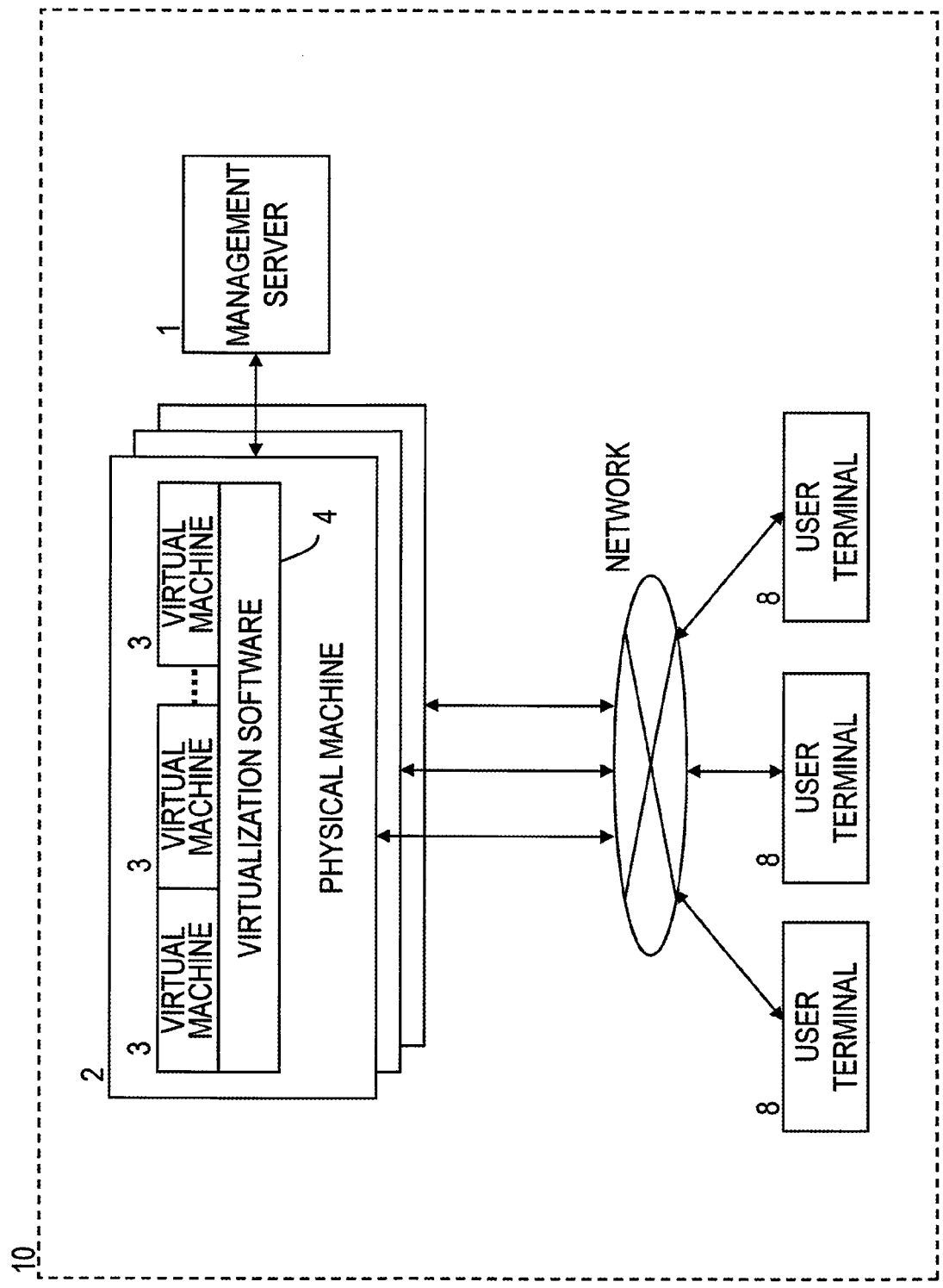
FIG. 1 is a diagram illustrating an overall configuration of an information processing system.

FIG. 1 is a diagram illustrating an overall configuration of an information processing system. An information processing system 10, illustrated in FIG. 1, includes a management server 1 and a physical machine 2 that generates virtual machines (VM), which are equipped in a data center. User terminals 8 can access the data center through a network such as the Internet and an intranet.

In an example illustrated in FIG. 1, the physical machine 2 includes a plurality of physical machines that each include a central processing unit (CPU), a random access memory (RAM), a large capacity memory such as a hard disk drive (HDD), and a network. The resources of the physical machine 2 are allocated to the plurality of virtual machines 3.

The management server 1, which can access the physical machine 2 for example, issues an instruction, to the physical machine 2, to generate the virtual machine 3 in the physical machine 2, and manages the generated virtual machine 3 for example.

For example, the virtual machine 3 is used by a service provider to provide infrastructures thereof and the like to users through the network (hereinafter, also referred to as a cloud service). The cloud service is a service for providing a basis for establishing and operating a computer system, that is, the infrastructures such as the virtual machine 3 and the network, through the network. For example, the user accesses a cloud service portal site through the user terminal 8 to select a specification for the virtual machine and seal a cloud use contract related to the specification. For example, the specification includes a clock frequency of the CPU, a capacity (GB) of the memory, a capacity (MB/sec, IOPS) of the hard disk, and a communication bandwidth (Gbps) of the network. With the user terminal 8, for example, the operation state of the virtual machine 3 can be monitored and the virtual machine can be operated.

Virtualization software 4 is infrastructure software that makes, in accordance with instructions from the management server 1, the virtual machine 3 operated by allocating the resource of the physical machine 2 such as the CPU, the memory, the hard disk, and the network. The virtualization software 4 operates on the physical machine 2 for example.

The virtual machine 3, allocated with the resource of the physical machine 2, includes, in its hard disk, an image file including an operating system (OS), middleware, application, a database, and the like. Upon being started, the virtual machine 3 writes the image file to the memory from the hard disk, and performs an operation corresponding to a requested service.

[Hypercall by Virtual Machine]

Figure 2:
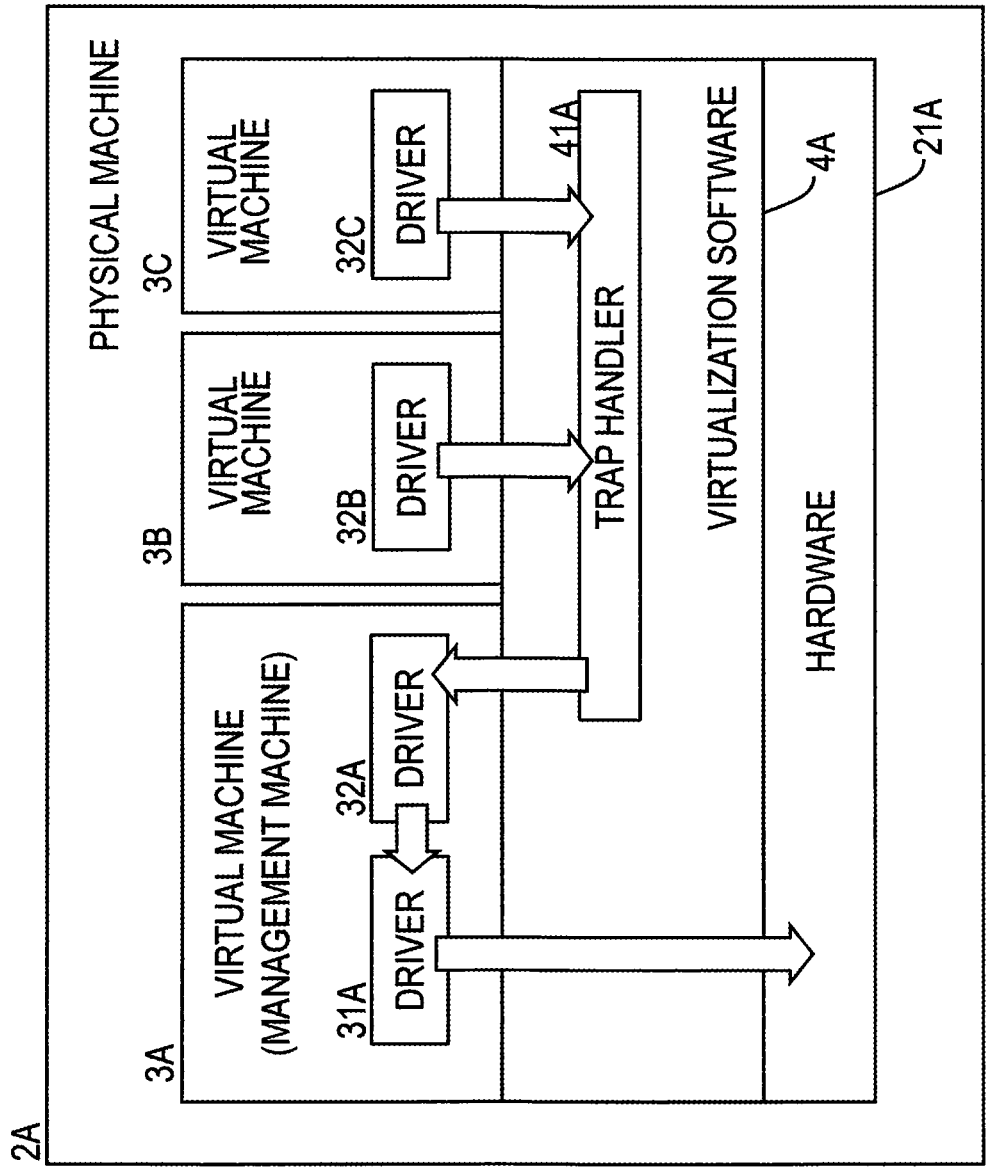
FIG. 2 is a diagram illustrating a hypercall.

Next, hypercall used by the virtual machine 3 to call a function of the virtualization software 4 is described. FIG. 2 is a diagram illustrating a relationship between the virtual machine and the virtualization software.

Virtualization software 4A illustrated in FIG. 2 is directly installed in hardware 21A of a physical machine 2A, and manages virtual machines 3A, 3B, and 3C. The virtual machine 3A in an example illustrated in FIG. 2 cooperates with the virtualization software 4 to, for example, manage the other virtual machines. A driver 31A of the virtual machine 3A in the example illustrated in FIG. 2 is a device driver for controlling a device (such as a physical NIC for example) of the hardware 21A. Drivers 32A, 32B, and 32C in the example illustrated in FIG. 2 are para virtualized (PV) drivers that operate in kernels of the virtual machines to achieve high speed processing of the virtual machines. Operations performed by the PV drivers are described later.

In the example illustrated in FIG. 2, for example, when the virtual machine 3C transmits a packet to the outside of the physical machine 2A, the virtual machine 3C transmits an interruption notification (hereinafter, referred to as hypervisor call or hypercall) to the virtualization software 4A, with the driver 32C. The virtualization software 4A receives the hypercall transmitted from the virtual machine 3C with a trap handler 41A as software for receiving the interruption notification, for example. Thus, the virtualization software 4A temporarily receives an access request to transmit a packet from each virtual machine to the hardware 21A, and the access request to the hardware 21A is made by the virtualization software 4A. Thus, the virtualization software 4A aggregates the access requests to the hardware 21A from the virtual machines, and thus reduces a number of access requests to the hardware 21A. Thus, the virtualization software 4A can improve the efficiency of the access from the virtual machines to the hardware 21A.

Next, for example, the virtualization software 4A instructs the driver 32A of the virtual machine 3A to access the hardware 21A, based on the content of the hypercall. For example, in response to the reception of the notification from the virtualization software 4A by the driver 32A, the virtual machine 3A instructs the driver 31A to transmit a packet, which is transmitted from the virtual machine 3A, to the device of the hardware 21A. Thus, in the example illustrated in FIG. 2, the virtual machine 3C accesses the hardware 21A by using the driver 31A of the virtual machine 3A. Thus, the virtualization software 4A does not have to install a device driver for directly accessing the device of the hardware 21A. All things considered, the virtualization software 4A can achieve smaller overhead and a more stable operation.

[Operation of PV Driver]

Figure 3:
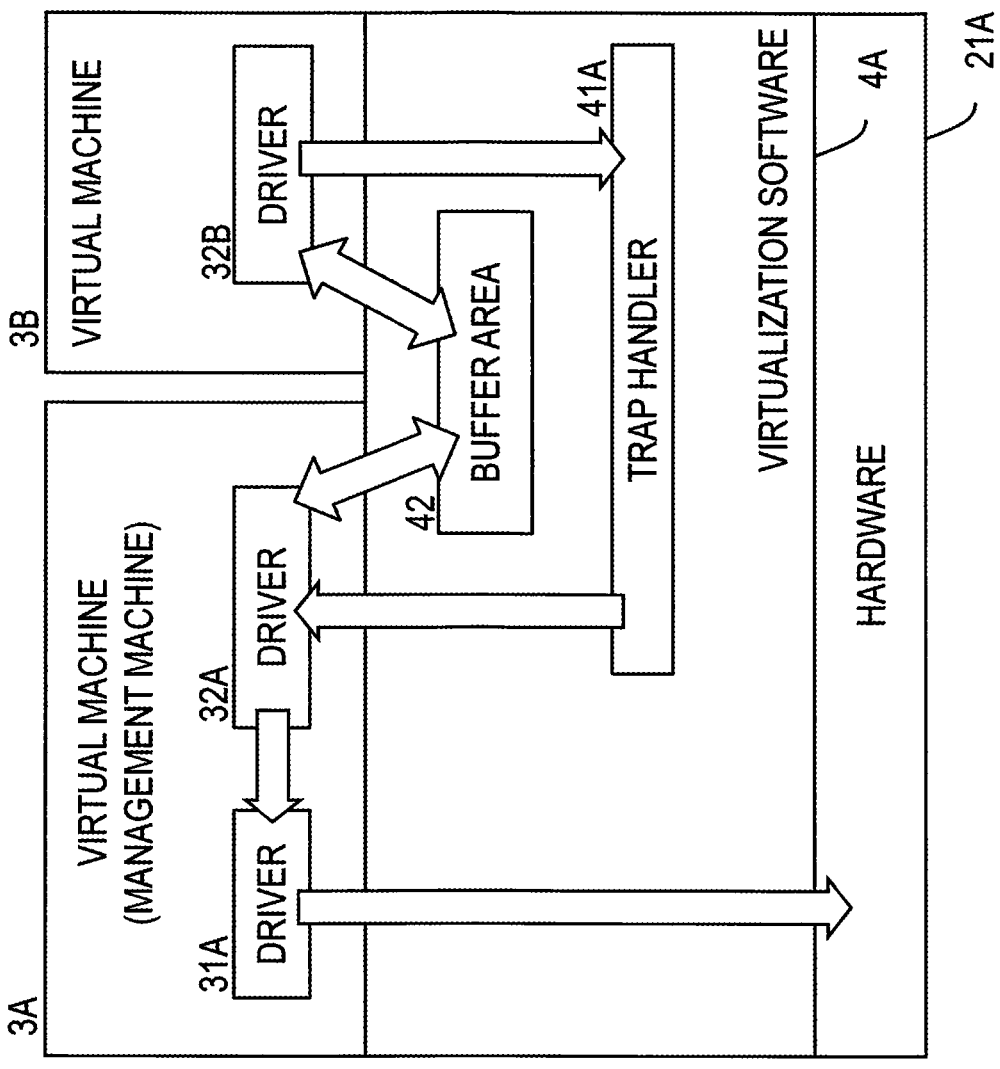
FIG. 3 is a diagram illustrating a driver of the virtual machine illustrated in FIG. 2.

Next, the PV driver is described. FIG. 3 is a diagram illustrating a driver of the virtual machine illustrated in FIG. 2. In FIG. 3, from among the drivers in FIG. 2, the PV driver is described with a relationship between the driver 32A of the virtual machine 3A and the driver 32B of the virtual machine 3B as an example.

The PV driver includes a backend driver installed in a virtual machine that can access hardware and a frontend driver installed in a virtual machine that is different from the virtual machine in which the backend driver is installed. Specifically, in the example illustrated in FIG. 3, the backend driver is the driver 32A installed in the virtual machine 3A that can access the hardware 21A, and the frontend driver is the driver 32B installed in the virtual machine 3B. For example, in the example illustrated in FIG. 3, the frontend driver transmits to the backend driver an access request and the like from the virtual machine 3B to the hardware 21A. For example, the backend driver notifies the driver 31A as the device driver of the access request to the hardware 21A, received from the frontend driver.

In the example illustrated in FIG. 3, the virtualization software 4A includes a buffer area 42. The drivers 32A and 32B can write and read data and parameters to and from the buffer area 42. An example of processing of transmitting data (packet) to the outside of the physical machine 2, performed by the virtual machine 3B, is described below.

First of all, for example, the virtual machine 3B writes an address of a memory area of the hardware 21A in which transmitted data is stored, to the buffer area 42. Then, the virtual machine 3B transmits the hypercall to the virtualization software 4A. The hypercall indicates that the address, in which the transmitted data is written is stored, is written to the buffer area 42. After the hypercall is received, the virtualization software 4A instructs the driver 32A of the virtual machine 3A to transmit the data to the address written in the buffer area 42, based on the content of the received hypercall. Then, the virtual machine 3A that has received the instruction from the virtualization software 4 acquires the address written to the buffer area 42 with the driver 32A. Then, the virtual machine 3A accesses the hardware 21A with the driver 31A, and transmits the data stored in the acquired address. Thus, the virtual machine 3B can execute processing on the hardware 21A without directly accessing the hardware 21A. The virtual machine 3A and the virtual machine 3B may transmit, for example, information on a destination of data to and from each other through the buffer area 42.

[Migration of Virtual Machine]

Figure 4:
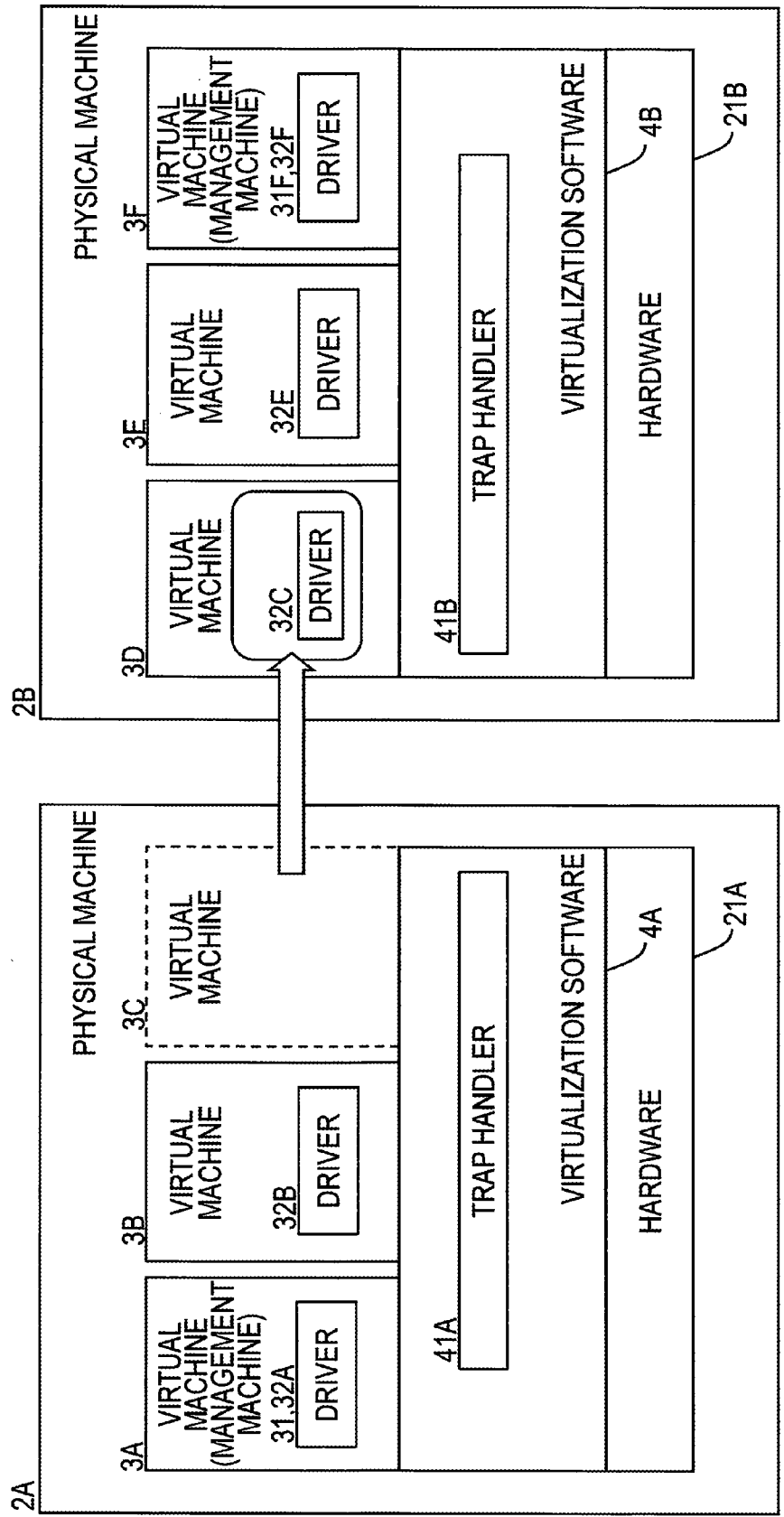

Next, migration of a virtual machine 3 will be described. FIGS. 4 to 6 are diagrams illustrating the migration of a virtual machine. The physical machine 2A in FIG. 4 and the physical machine 2A described with reference to FIG. 2 have the same configuration.

FIG. 4 illustrates a case where the virtual machine 3C is migrated from the physical machine 2A to the physical machine 2B as a virtual machine 3D. In FIG. 4, the virtualization software 4B is directly installed in the hardware 21B of the physical machine 2B. In the example illustrated in FIG. 4, the virtualization software 4B manages virtual machines 3D, 3E, and 3F. The virtual machine 3F cooperates with the virtualization software 4 to manage the other virtual machines, as in the case of the virtual machine 3A. As illustrated in FIG. 4, the virtual machine 3C including the driver 32C is directly migrated from the physical machine 2A to the physical machine 2B as a virtual machine 3D by the migration. The virtualization software 4A and the virtualization software 4B are assumed to be the same type of virtualization software, in the example illustrated in FIG. 4 and FIG. 5.

Next, FIG. 5 illustrates a case where the driver 32C after the migration performs the hypercall to the virtualization software 4B. In the example illustrated in FIG. 5, the virtualization software 4A and the virtualization software 4B are the same type of virtualization software. Thus, the driver 32C corresponds to the virtualization software 4B after the migration, whereby the virtualization software 4B can execute the hypercall transmitted by the virtual machine 3D with the driver 32C. This means that with the driver 32C illustrated in FIG. 5, a driver, corresponding to the virtualization software after the migration, needs not to be installed in response to the migration. All things considered, live migration can be performed between the physical machines on which the same type of virtualization software operates.

FIG. 6 illustrates a case where the virtualization software 4A and the virtualization software 4B are of different types. As illustrated in FIG. 6, when the virtual machine 3C is migrated from the physical machine 2A to the physical machine 2B as the virtual machine 3D is executed, the migrated driver 32C does not correspond to the virtualization software 4B in the migration destination. Thus, the virtualization software 4B is unable to figure out the content of the hypercall transmitted from the driver 32C, and thus is unable to execute processing based on the hypercall. Thus, as illustrated in FIG. 6, the PV driver corresponding to the virtualization software 4B needs to be installed in the virtual machine 3D by restarting the virtual machine 3D after the migration is completed. Then, the virtualization software 4B can execute the hypercall transmitted from the virtual machine 3D. As illustrated in FIG. 6, the restarting needs to be performed when the migration is performed between the physical machines on which the different types of virtualization software pieces operate, and thus the live migration is unable to be performed. Thus, the migration between the physical machines on which the different types of virtualization software operate is more restricted, in terms of conditions of execution and the like, compared with the migration between the physical machines on which the same type of virtualization software operates.

Thus, in this embodiment, upon acquiring the hypercall, the virtualization software 4B determines the type of the virtualization software that can execute the hypercall, based on information in which the hypercall and the type of the virtualization software corresponding to the hypercall are associated with each other. The virtualization software 4B converts the hypercall into the hypercall that can be executed by the virtualization software 4B, whereby the migration is performed without restarting the virtual machine.

[Hardware Configuration of Physical Machine]

Figure 7:
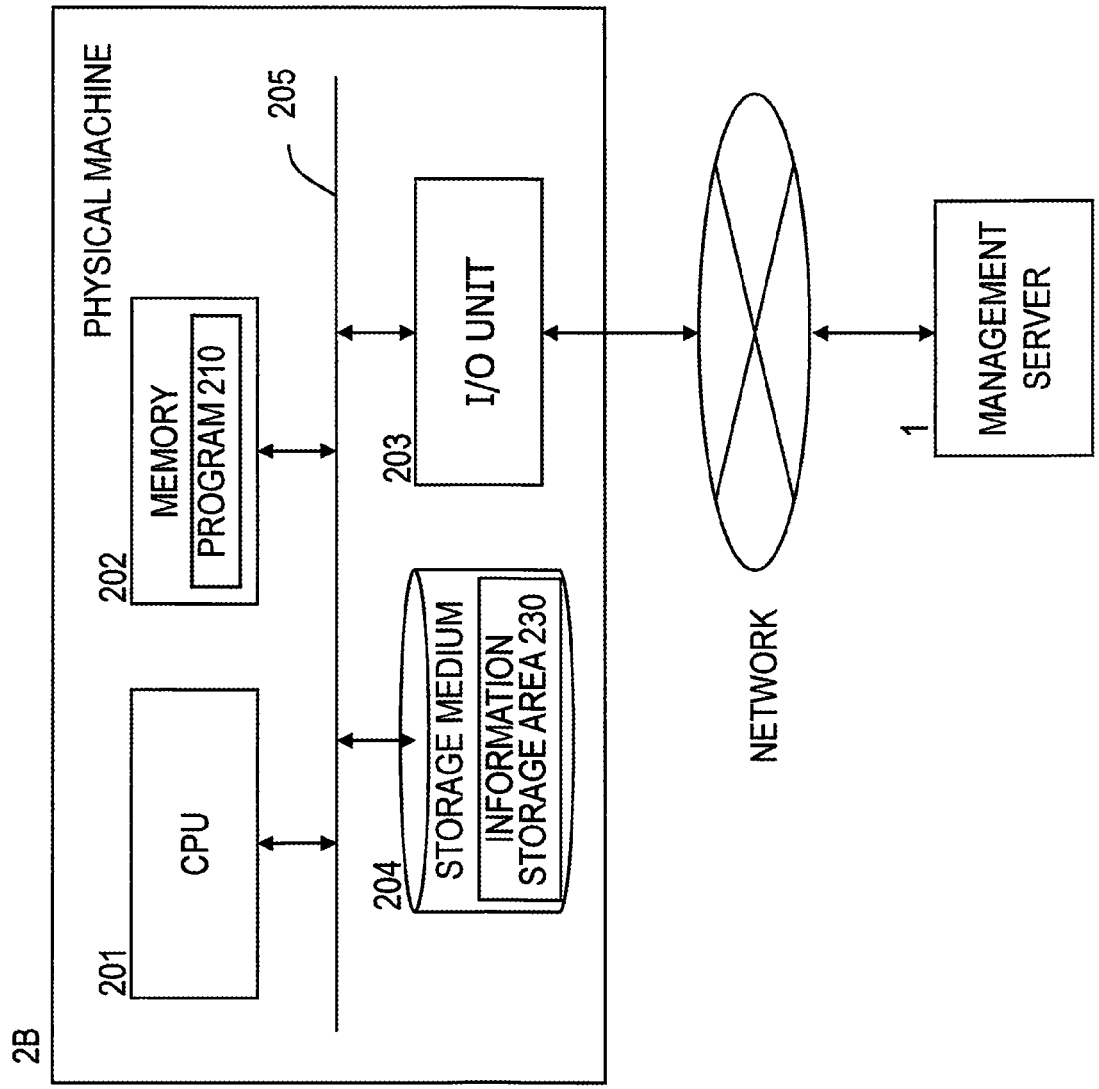
FIG. 7 is a diagram illustrating a hardware configuration of the physical machine.

Next, a configuration of the physical machine 2B will be described. FIG. 7 is a diagram illustrating a hardware configuration of the physical machine. The physical machine 2B includes a CPU 201 as a processor, a memory 202, an external interface (I/O unit) 203, and a storage medium 204 that are connected to each other through a bus 205. For example, the storage medium 204 stores a program (not illustrated) for executing processing of starting the virtualization software 4, in a program storage area (not illustrated) in the storage medium 204. The storage medium 204 stores a program 210 (hereinafter, also referred to as a notification conversion program) for executing processing (hereinafter, also referred to as notification conversion processing) for converting the hypercall, received from the virtual machine 3, in the program storage area in the storage medium 204 for example. As illustrated in FIG. 7, when the program 210 is executed, the CPU 201 loads the program 210 from the storage medium 204 onto the memory 202 and cooperates with the program 210 to execute the notification conversion processing. The storage medium 204 includes an information storage area 230 (hereinafter, also referred to as a storage unit 230) that stores information used for executing the notification conversion processing for example.

Figure 8:
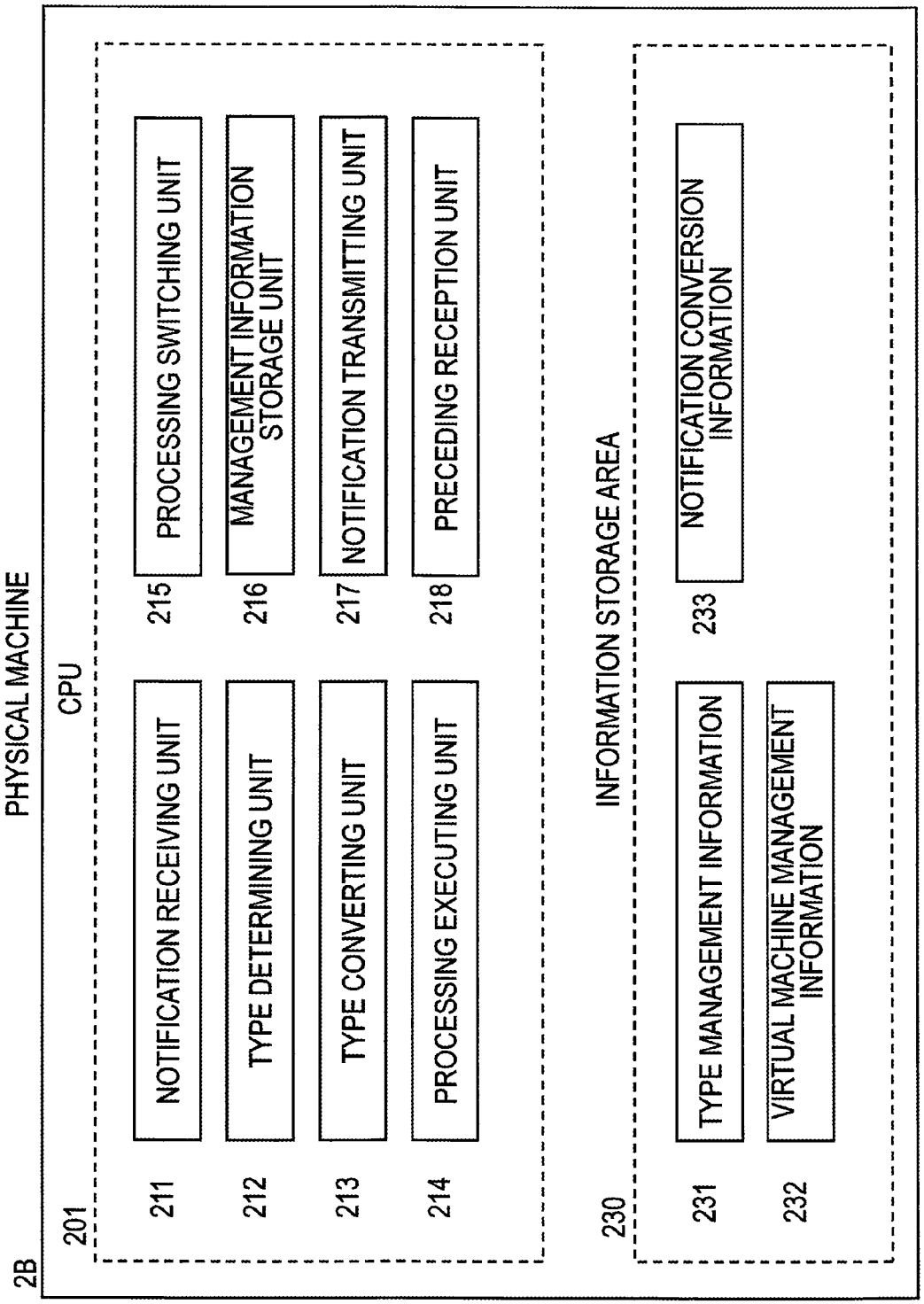
FIG. 8 is a functional block diagram of the physical machine in FIG. 7.

FIG. 8 is a functional block diagram of the physical machine in FIG. 7. The CPU 201 cooperates with the program 210 to operate as a notification receiving unit 211, a type determining unit 212, a type converting unit 213, and a processing executing unit 214 (hereinafter, the notification receiving unit 211, the type determining unit 212, the type converting unit 213, and the processing executing unit 214 are also collectively referred to as a notification converting unit 210). The CPU 201 cooperates with the program 210 to operate as, for example, a processing switching unit 215, a management information storage unit 216, a notification transmitting unit 217, and a preceding reception unit 218. The information storage area 230 stores therein type management information 231 (hereinafter, also referred to as first information), virtual machine management information 232 (hereinafter, also referred to as second information), and notification conversion information 233 (hereinafter, also referred to as third information). The functions described above operate as the functions of the virtualization software 4B illustrated in FIG. 6 for example.

The notification receiving unit 211 receives the hypercall (hereinafter, also referred to as a first notification) notified from the virtual machine generated in the physical machine 2B, for example. The notification receiving unit 211 may include a trap handler as software for trapping the hypercall, for example.

The type determining unit 212 refers to the type management information 231 to determine the type of the virtualization software that can execute the acquired hypercall, in response to the acquisition of the hypercall transmitted from the virtual machine by the notification receiving unit 211.

The type management information 231 is information in which the hypercall and the type of the virtualization software that can execute the hypercall are associated with each other, for example. The type management information 231 is described in detail later.

The type converting unit 213 converts the hypercall, acquired by the notification receiving unit 211, into the hypercall (hereinafter, also referred to as a second notification) executable by the virtualization software (the virtualization software 4B in the example illustrated FIG. 6) that received hypercall, based on the type of the virtualization software determined by the type determining unit 212 for example. The type converting unit 213 may refer to the notification conversion information 233, including information on the hypercall executable by each virtualization software, to covert the hypercall for example. The notification conversion information 233 is described in detail later. The type converting unit 213 needs not to execute the conversion when the processing executing unit 214, which is described later, can execute the hypercall received by the notification receiving unit 211 without implementing conversion.

The processing executing unit 214 executes each processing based on the content of the hypercall obtained by conversion by the processing switching unit 215 for example. The processing based on the content of the hypercall includes the request for the virtual machine including the device driver and the like to access to the hardware. The processing executing unit 214 may include a plurality of processing executing units for executing a plurality of pieces of processing in accordance with the type of the hypercall.

For example, the processing switching unit 215 specifies the virtual machine as the transmission source of the hypercall in response to the reception of the hypercall from the virtual machine by the notification receiving unit 211. Then, the processing switching unit 215 refers to the virtual machine management information 232 for example. When the information related to the specified virtual machine is not stored, the processing switching unit 215 transmits the acquired hypercall to the type determining unit 212. The processing switching unit 215 refers to the virtual machine management information 232, and when the information related to the determined virtual machine is stored, the processing switching unit 215 determines the type of the virtualization software corresponding to the acquired hypercall based on the virtualization management information 232. For example, the virtualization management information 232 is information in which information for specifying the virtual machine as the transmission source of the hypercall and the type of the virtualization software corresponding to the hypercall are associated with each other. The virtualization management information 232 is described in detail later.

For example, the management information storage unit 216 stores the virtual machine management information 232, related to the virtual machine as the transmission source of the hypercall, based on the type of the virtualization software determined by the type determining unit 212, when, for example, the processing switching unit 215 refers to the virtual machine management information 232 and determines that information related to the virtual machine as the transmission source of the hypercall is not stored.

When, for example, the processing switching unit 215 refers to the virtual machine management information 232 and determines that information related to the virtual machine as the transmission source of the hypercall is not stored, the notification transmitting unit 217 issues a notification (hereinafter, also referred to as an error notification) indicating that the information is not stored to the virtual machine as the transmission source.

A preceding reception unit 218 receives the virtual machine management information 232 transmitted by the virtualization software (including the virtualization software 4A in FIG. 6) different from the virtualization software 4B in FIG. 6. When the received virtual machine management information 232 has not been stored, the preceding reception unit 218 stores the received virtual machine management information 232 in the information storage area 230.

[First Embodiment]

Figure 9:
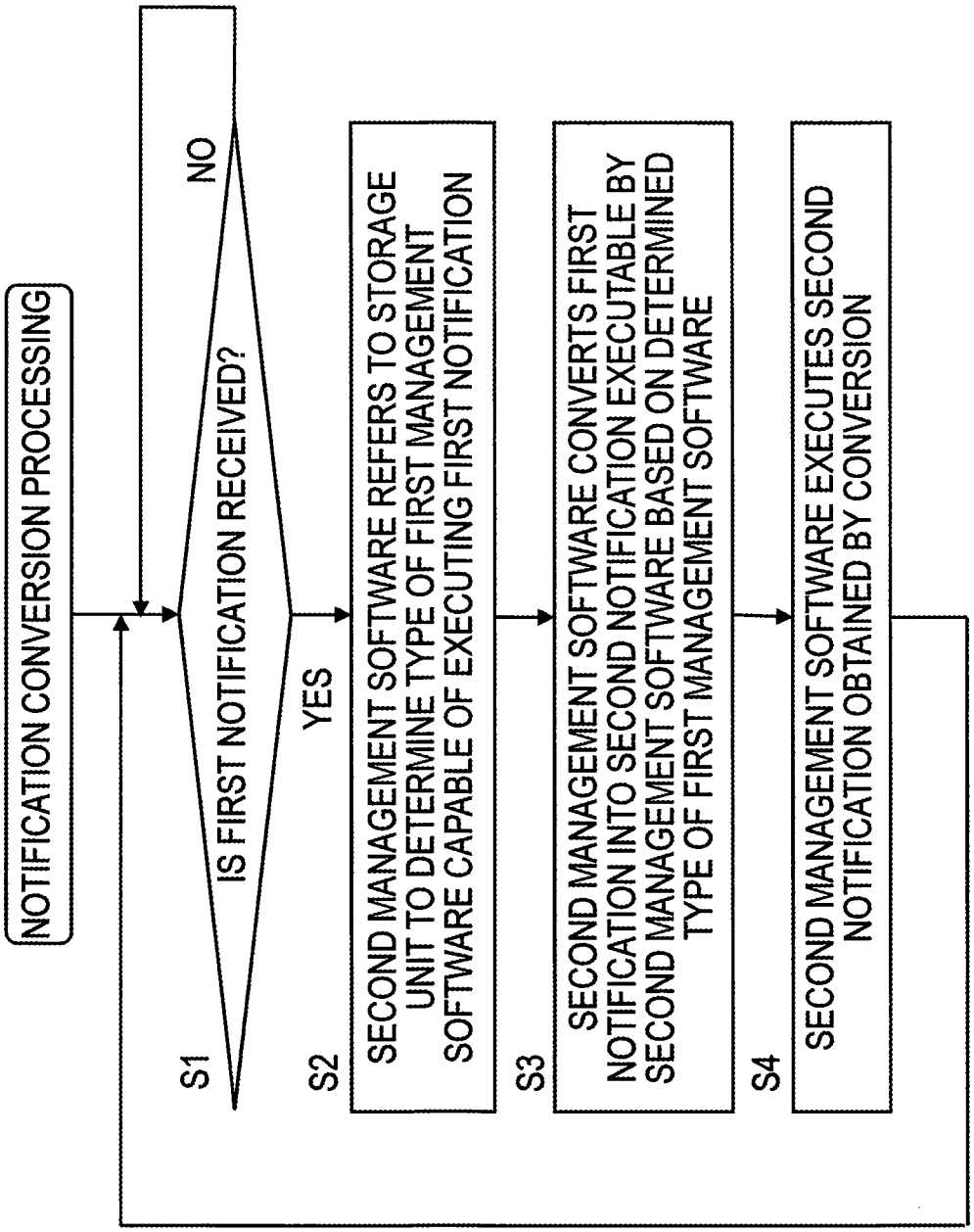
FIG. 9 is a flowchart illustrating an overview of notification conversion processing in the first embodiment.
Figure 10:
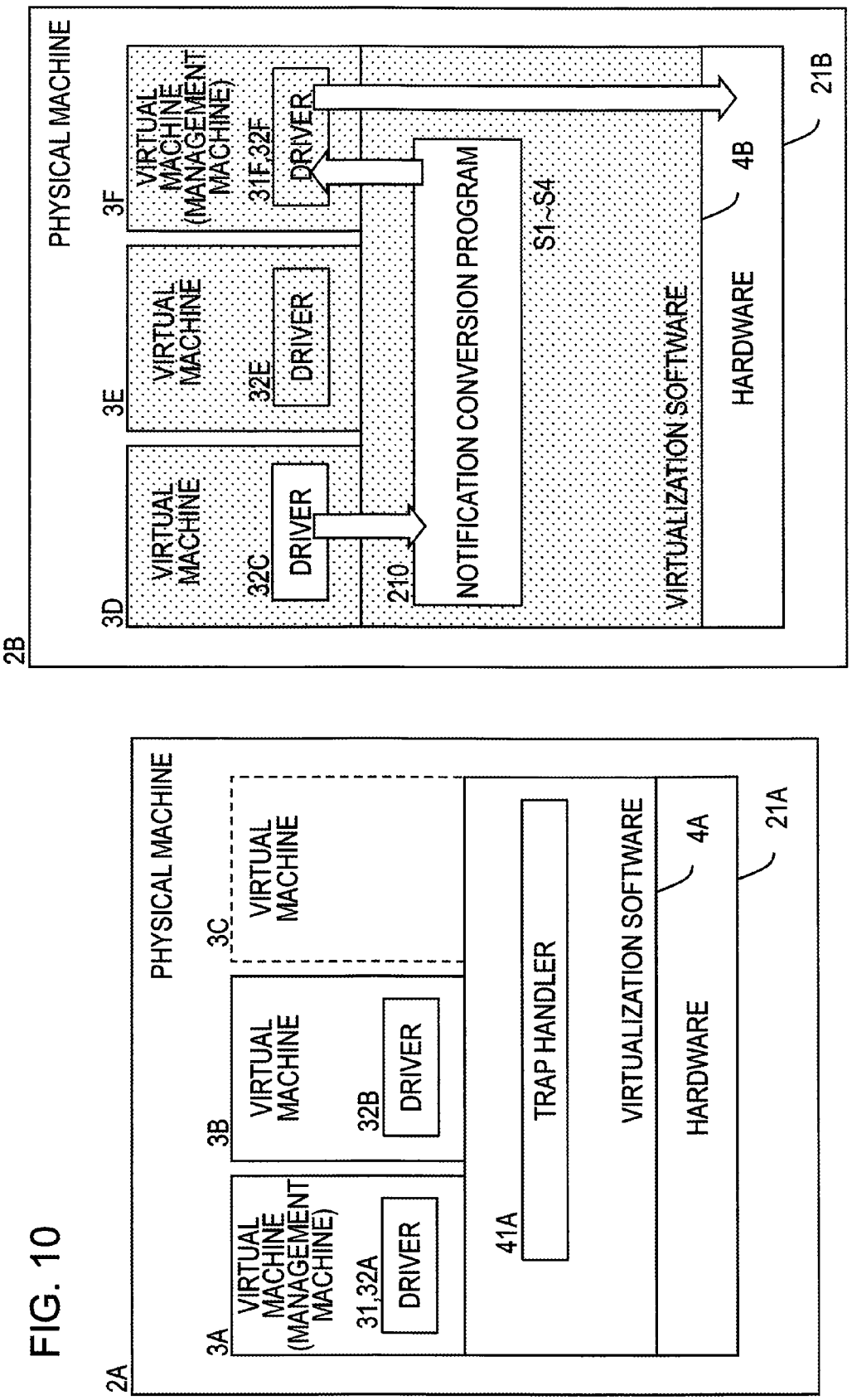
FIG. 10 is a diagram illustrating an overview of the notification conversion processing in the first embodiment.

Next, the first embodiment will be described. FIG. 9 is a flowchart illustrating an overview of notification conversion processing in the first embodiment. FIG. 10 is a diagram illustrating an overview of the notification conversion processing in the first embodiment. The overview of the notification conversion processing in FIG. 9 is described with reference to FIG. 10.

First of all, the virtualization software 4B illustrated in FIG. 10 (hereinafter, referred to as second management software) waits until the hypercall is received from any of the virtual machines managed by the virtualization software 4B (S1). When the hypercall is received by the virtualization software 4B (YES in S1), the virtualization software 4B refers to the storage unit 230 and determines the type of the virtualization software (hereinafter, referred to as first management software) that can execute the received hypercall (S2).

When the migration of the virtual machine and the like has been executed, the driver, installed in the virtual machine managed by the virtualization software 4B, might be the driver corresponding to the virtualization software managing the virtual machine before the migration. In such a case, the virtualization software 4B that manages the virtual machine after the migration might not be able to directly execute the hypercall received from the driver. Thus, in the present embodiment, the virtualization software 4B that has received the hypercall determines at the time hypercall reception the type of the virtualization software that can execute the hypercall. Thus, as described later, the virtualization software 4B can convert the received hypercall into the hypercall executable by the virtualization software 4B.

The virtualization software 4B converts the received hypercall into the hypercall in a format executable by the virtualization software 4B based on the determined type of virtualization software for example (S3). Then, the virtualization software 4B executes the hypercall obtained by the conversion (S4). More specifically, the virtualization software 4B executes processing based on the content of the hypercall obtained by the conversion. A specific example of the notification conversion processing is described below.

FIG. 10 is a diagram illustrating the specific example of the overview of the notification conversion processing in the first embodiment. In FIG. 10, as in FIG. 6, a case is described where the driver 32C corresponds to the virtualization software 4A, and the virtualization software 4B is unable to execute the hypercall transmitted by the virtual machine 3D with the driver 32C.

In the example illustrated in FIG. 10, when the hypercall is received from the virtual machine 3D for example (S1), the notification converting unit 210 of the virtualization software 4B determines that the type of the virtualization software that can execute the received hypercall includes a type of the virtualization software 4A (S2). Then, the notification converting unit 210 converts the received hypercall into the hypercall executable by the virtualization software 4B (S3). Then, for example, the notification converting unit 210 executes processing based on the content of the hypercall obtained by the conversion (S4).

Thus, even when the hypercall of a non-executable type is received from the virtual machine, the virtualization software 4B can execute the processing based on the hypercall by converting the hypercall. Thus, the virtual machine managed by the virtualization software 4B can transmit the hypercall to the virtualization software 4B, regardless of whether the hypercall transmitted by the virtual machine corresponds to the hypercall executable by the virtualization software 4B. Accordingly, the virtual machine to which the migration has been implemented needs not to be restarted to install the driver and the like corresponding to the virtualization software after the migration. Thus, the virtual machine managed by the virtualization software 4B of this embodiment can perform the live migration with the virtual machine managed by the different virtualization software.

As described above, in the first embodiment, in response to the reception of the hypercall transmitted by the virtual machine, the virtualization software 4B refers to the storage unit 230 storing therein the information in which the hypercall and the type of the virtualization software that can execute the hypercall are associated with each other, and determines the type of the virtualization software that can execute the acquired hypercall. Then, the virtualization software 4B convers, based on the determined type of virtualization software, the acquired hypercall into a format executable by the virtualization software 4B that has acquired the hypercall, and executes the hypercall obtained by the conversion. Thus, with the virtual machine that transmits the hypercall to the virtualization software 4B, the live migration can be performed between the physical machines on which different types of virtualization software operate.

[Details of First Embodiment]

Figure 11:
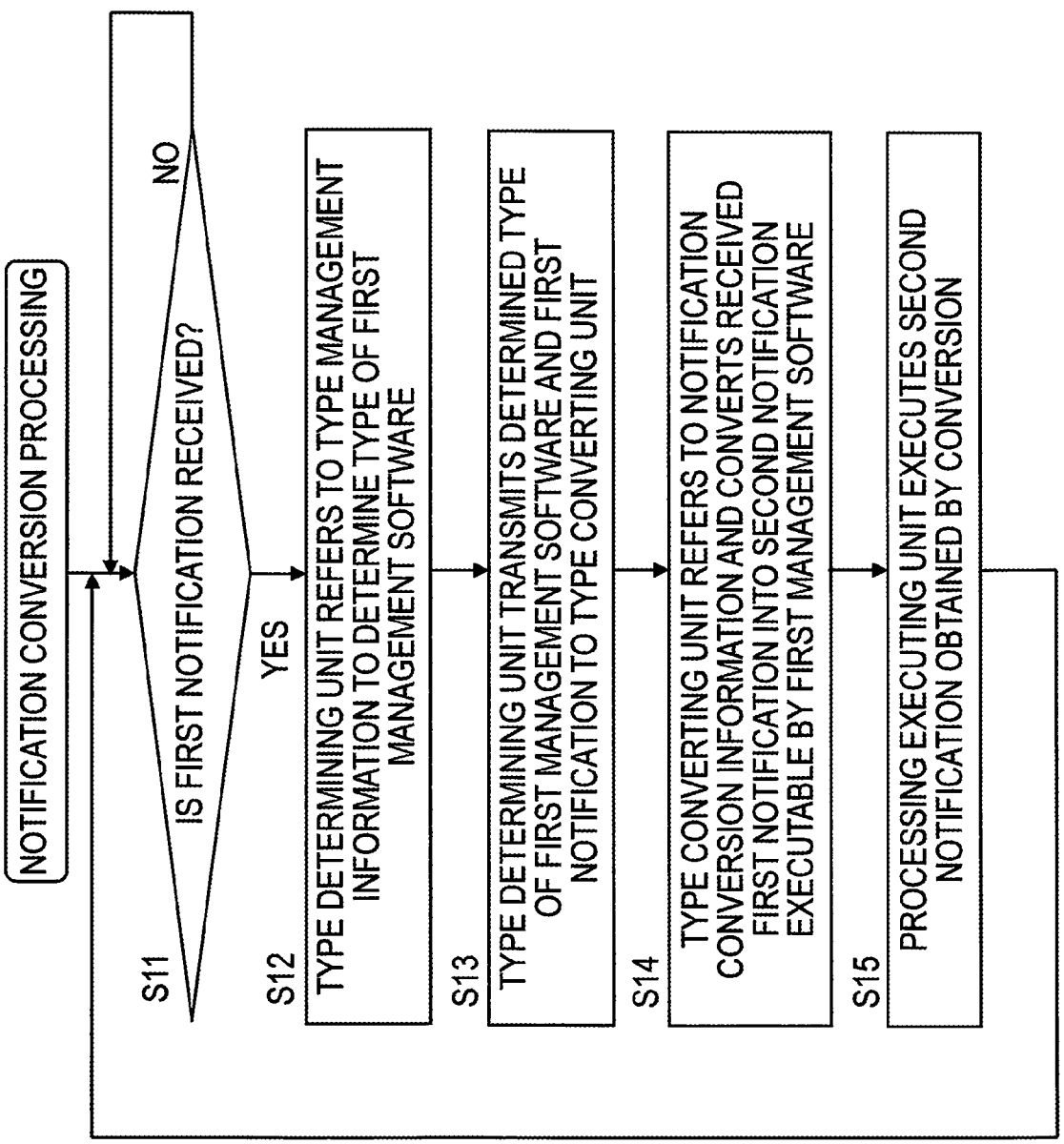
FIG. 11 is a flowchart illustrating a detail of the notification conversion processing in the first embodiment.

Next, details of the first embodiment are described. FIG. 11 is a flowchart illustrating a detail of the notification conversion processing in the first embodiment. FIGS. 12 to 16 are diagrams illustrating the detail of the notification conversion processing in the first embodiment. The detail of the notification conversion processing in FIG. 11 is described with reference to FIGS. 12 to 16.

First of all, as illustrated in FIG. 11, the notification receiving unit 211 of the virtualization software 4B waits until the hypercall is received from any of the virtual machines 3 managed by the virtualization software 4B (S11). When the notification receiving unit 211 receives the hypercall (YES in S11), for example, the type determining unit 212 refers to the type management information 231, and determines the type of the virtualization software that can execute the hypercall (S12).

Figure 12:
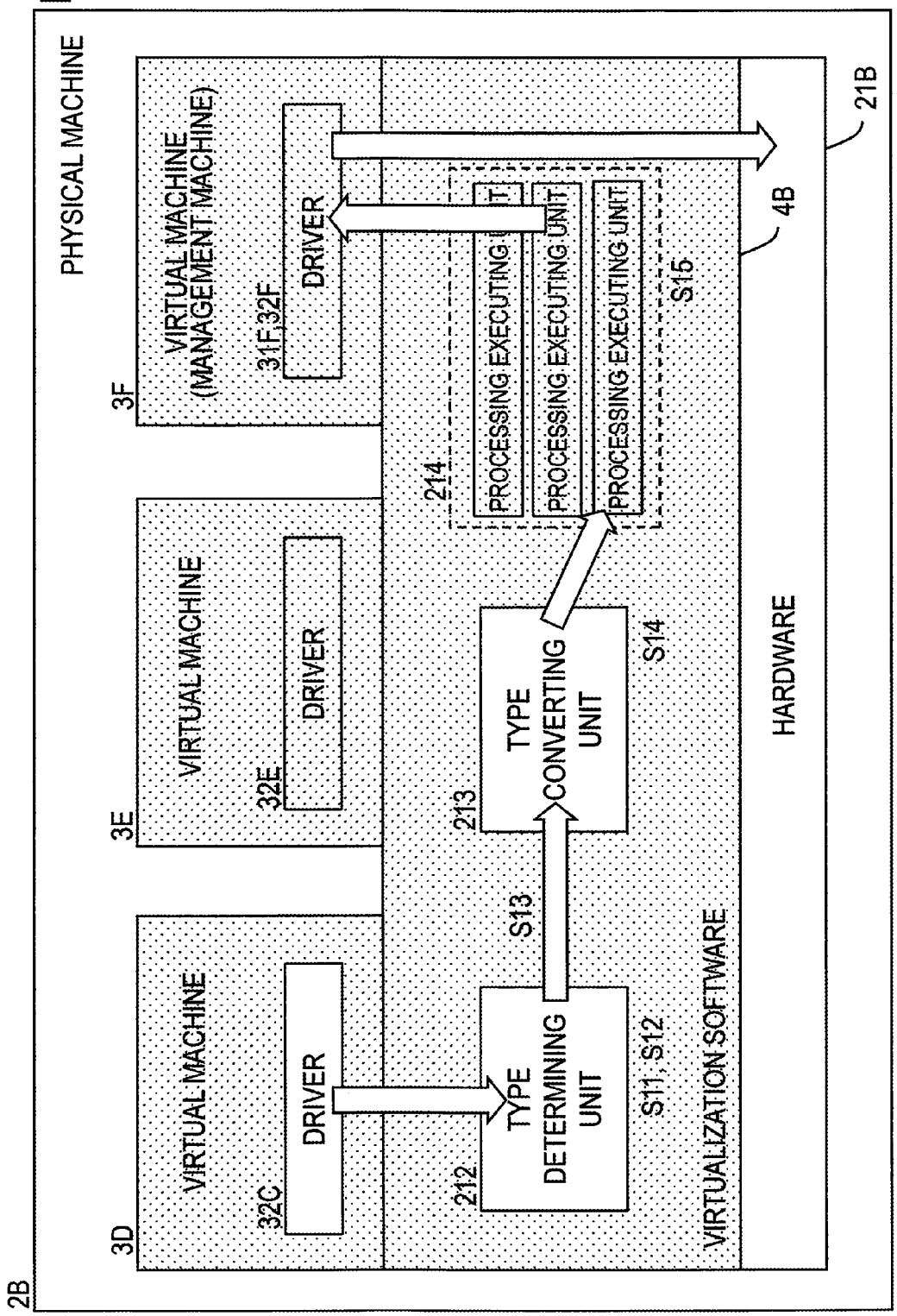
Figure 15:
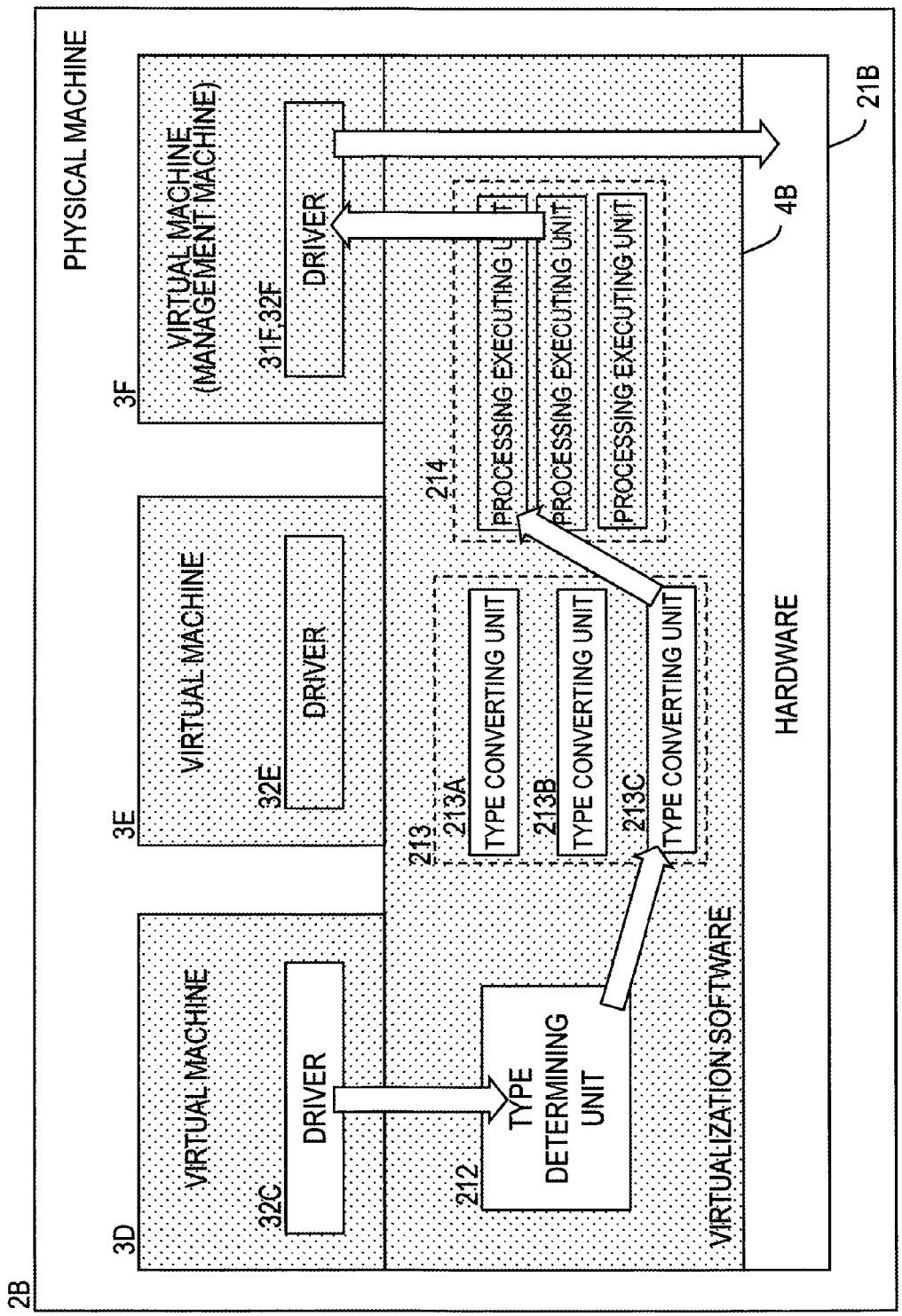

FIG. 12 is a diagram illustrating a specific example of the detail of the notification conversion processing in the first embodiment. As in FIG. 10, FIG. 12 illustrates an example of a case where the virtual machine 3C transmits the hypercall for accessing the hardware 21B to the virtualization software 4B, with the driver 32C, not corresponding to the virtualization software 4B. In the example illustrated in FIG. 12, the notification receiving unit 211 and the like are omitted.

As illustrated in FIG. 12, the virtual machine 3D transmits the hypercall to the virtualization software 4B with the driver 32C. After the notification receiving unit 211 receives the hypercall transmitted by the virtual machine 3D, the type determining unit 212 determines the type of the virtualization software that can execute the received hypercall (YES in S11, S12). The determination of the type of the virtualization software by the type determining unit 212 is described below.

FIG. 13 is a diagram illustrating a specific example of the type management information 231. The type management information 231 in FIG. 13 includes, as items, "hypercall" and "type" indicating the virtual software that can execute the hypercall. In the type management information 231 in FIG. 13, an AAA command as hypercall and a type HV-A of virtualization software are stored while being associated with each other, a BBB command as hypercall and a type HV-B of virtualization software are stored while being associated with each other, and a CCC command as the hypercall and a type HV-C of the virtualization software are stored while being associated with each other.

More specifically, for example, when the execution of the BBB command is trapped by the notification receiving unit 211, the type determining unit 212 refers to the type management information 231 illustrated in FIG. 13, and acquires the type HV-B of the virtualization software stored while being associated with the trapped BBB command. Thus, the virtualization software 4B can acquire, with reference to the type management information 231, the information on the type HV-B of the virtualization software that can execute the BBB command as the hypercall.

Referring back to FIG. 11, for example, after determining the type of the virtualization software that can execute the received hypercall, the type determining unit 212 transmits the determined type of the virtualization software and the content of the hypercall received by the notification receiving unit 211, to the type converting unit 213 (S13). More specifically, when the HV-A is the type of the virtualization software determined by the type determining unit 212 in an example illustrated in FIG. 13, the type determining unit 212 transmits the information indicating HV-A and the content of the received hypercall to the type converting unit 213.

Next, for example, the type converting unit 213 refers to the notification conversion information 233, and converts the received hypercall into the hypercall executable by the virtualization software 4B (S14). The conversion of the hypercall performed by the type converting unit 213 is described below.

FIG. 14 is a diagram illustrating a specific example of the notification conversion information 233. The notification conversion information 233 in FIG. 14 includes, as items, "type" indicating the virtualization software, as well as "hypercall 1", "hypercall 2", and "hypercall 3" indicating the content of the hypercall. The number of items related to the hypercall, which is three in the example illustrated in FIG. 14, may be changed in accordance with the type of the hypercall that might be received by the notification receiving unit 211. In the notification conversion information 233 illustrated in FIG. 14, a hypercall A1 that can be executed by the HV-A is associated with a hypercall B1 that can be executed by the HV-B, and a hypercall C1 that can be executed by the HV-C. Specifically, when the type of the virtualization software 4B in FIG. 12 is HV-C and the type converting unit 213 receives information indicating that the type of the virtualization software 4B is HV-B and information indicating that B3 is the content of the hypercall, the type converting unit 213 converts the content of the received hypercall into C3.

Referring back to FIG. 11, the processing executing unit 214 executes the processing based on the content of the hypercall obtained by the conversion by the type converting unit 213 (S15). As illustrated in FIG. 12, the processing executing unit 214 may include a plurality of processing executing units for example. Each processing executing unit may execute processing of acquiring information stored in the memory of the hardware 21B in response to a request from the virtual machine, or processing of transmitting a packet from the physical NIC of the hardware 21B to the outside of the physical machine 2 in response to a request from the virtual machine, and the like. In the example illustrated in FIG. 12, the hypercall received by the processing executing unit 214 has been converted into the format of the hypercall executable by the virtualization software 4B by the type converting unit 213. Thus, the processing executing unit 214 in the example illustrated in FIG. 12 only needs to be capable of recognizing the content of the hypercall that has been converted into the format executable by the virtualization software 4B.

[Processing Executed When There are More Than One Type Converting Units]

Next, processing executed when there are more than one type converting units 213 will be described. The virtualization software 4B illustrated in FIG. 15 includes a plurality of type converting units (type converting units 213A, 213B, and 213C) that may be respectively provided for the types of the hypercall that might be received by the notification receiving unit 211 for example. The type determining unit 212 determines the type of the virtual software that can execute the received hypercall, and then allocates pieces of information related to the type of the determined virtualization software to the plurality of type converting units, based on the determined type of the virtual software. Thus, the type determining unit 212 needs not to transmit the information related to the determined type of the virtualization software to the type converting unit 213, and can directly transmit the content of the hypercall received by the notification receiving unit 211.

FIG. 16 illustrates a specific example of the type management information 231 in the case where there are more than one type converting units. Unlike the type management information 231 illustrated in FIG. 13, the type management information 231 illustrated in FIG. 16 includes an item "transmission destination", to which the type of the virtualization software determined by the type determining unit 212 and the like are transmitted, associated with the items "hypercall" and "type". For example, the hypercall as the AAA command is associated with HV-A as the type of the virtualization software, and the type converting unit 213A to which the information is transmitted from the type determining unit 212. Specifically, for example, the type determining unit 212, which has determined HV-C as the type of the virtual software that can execute the received hypercall, refers to the type management information 231 illustrated in FIG. 16 and acquires information on the type converting unit 213C as the transmission destination of the information. For example, the type determining unit 212 directly transmits the content of the hypercall received by the notification receiving unit 211 to the type converting unit 213C. The type converting unit 213C converts the received hypercall into the hypercall in a format executable by the virtualization software 4B. More specifically, each type converting unit receives only the hypercall associated with the corresponding type of the virtualization software in the type management information 231 illustrated in FIG. 16. Each type converting unit converts only the hypercall associated with the corresponding type of the virtualization software in the type management information 231 into the hypercall executable by the virtualization software 4B. A type converting unit in a second embodiment may include a trap handler for receiving a hypercall transmitted from the type determining unit 212.

[Second Embodiment]

Figure 17:
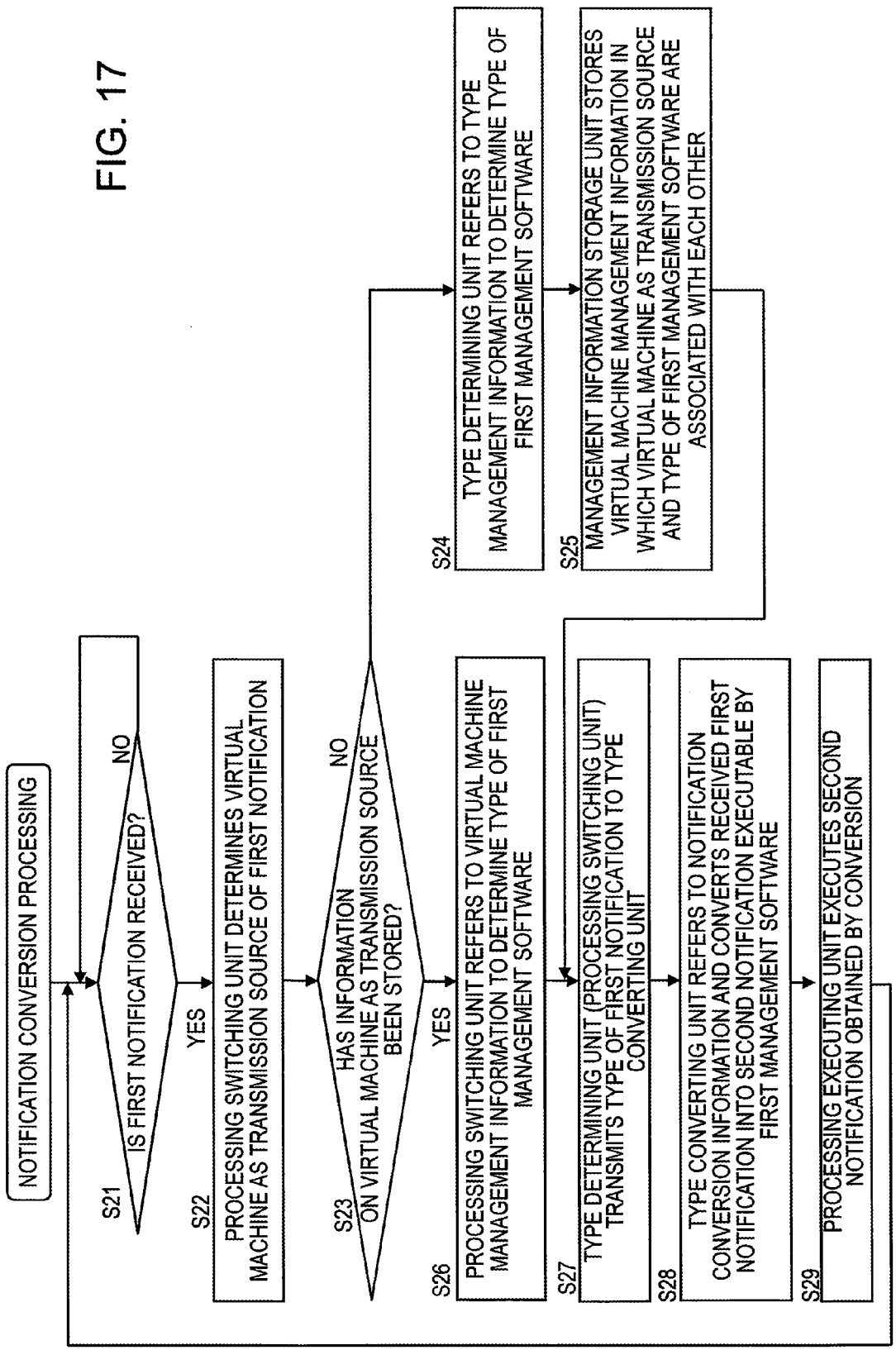
FIG. 17 is a flowchart illustrating notification conversion processing in the second embodiment.
Figure 18:
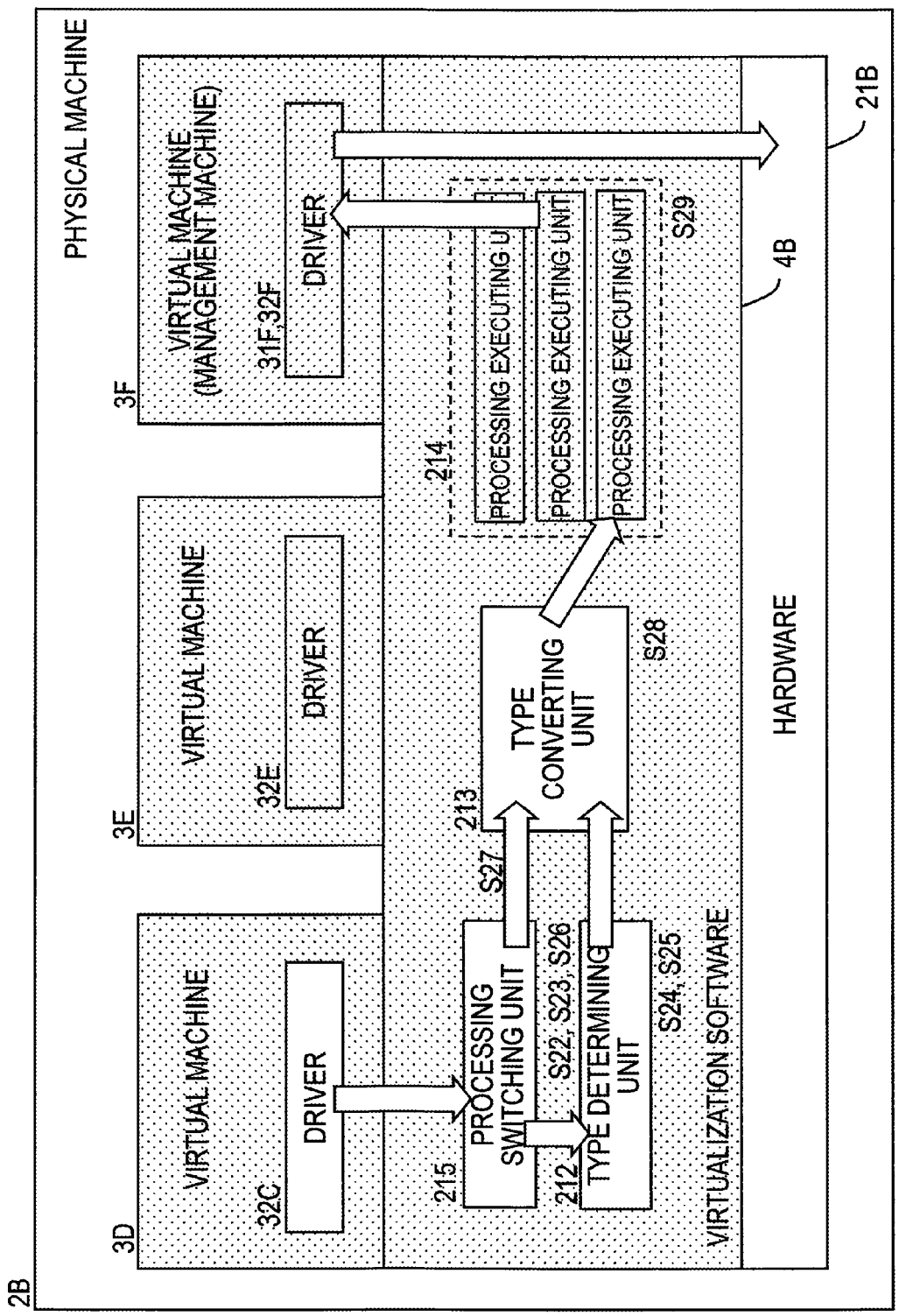

Next, the second embodiment will be described. FIG. 17 is a flowchart illustrating notification conversion processing in the second embodiment. FIG. 18 and FIG. 19 are diagrams illustrating the notification conversion processing in the second embodiment.

Unlike in the notification conversion processing in the first embodiment, in the notification conversion processing in the second embodiment, the processing switching unit 215 refers to the virtual machine management information 232 before the type determining unit 212 determines the type of the virtualization software. When the information, related to the virtual machine as the transmission source of the received hypercall, is stored in the virtual machine management information 232, the processing switching unit 215 does not call the type determining unit 212 and executes processing based on the content of the virtual machine management information 232. A detail of the notification conversion processing in the second embodiment is described below.

First of all, as illustrated in FIG. 17, the notification receiving unit 211 waits until the hypercall is received for example as in the first embodiment (S21). When the notification receiving unit 211 receives the hypercall (YES in S21), the processing switching unit 215 of the virtualization software 4B determines the virtual machine as the transmission source of the hypercall received by the notification receiving unit 211 for example (S22). For example, the processing switching unit 215 may determine the virtual machine as the transmission source of the hypercall by acquiring the information in the hypercall received by the notification receiving unit 211 for example.

Next, the processing switching unit 215 refers to the virtual machine management information 232, and determines whether the information, related to the virtual machine as the transmission source of the hypercall determined by the processing switching unit 215, is stored (S23). When the information related to the determined transmission source virtual machine is stored (YES in S23), the processing switching unit 215 refers to the virtual machine management information 232 and determines the type of the virtualization software that can execute the received hypercall (S26). Specifically, when the hypercall is received, the virtualization software 4B determines whether the information related to the virtual machine as the transmission source of the hypercall is stored in the virtual machine management information 232. When the information related to the virtual machine as the transmission source of the received hypercall is stored, the processing switching unit 215 does not call the type determining unit 212, and determines the type of the virtualization software that can execute the received hypercall, based on the content of the virtual machine management information 232. Thus, when the information related to the virtual machine as the transmission source of the received hypercall is stored, the type determining unit 212 that analyzes the hypercall needs not to be implemented every time. Thus, the processing load on the virtualization software 4B can be reduced.

On the other hand, when the information related to the virtual machine as the transmission source of the hypercall, determined by the processing switching unit 215, is not stored in the virtual machine management information 232 (NO in S23), the processing is passed onto the type determining unit 212 from the processing switching unit 215.

More specifically, for example, the type determining unit 212 refers to the type management information 231 and determines the virtualization software that can execute the hypercall received by the notification receiving unit 211 as in S12 in the first embodiment (S24). In such a case, the management information storage unit 216 of the virtualization software 4B associates the virtual machine as the transmission source determined by the processing switching unit 215 with the type of the virtualization software determined by the type determining unit 212 and stores the same in the virtual machine management information 232 (S25). Thus, the management information storage unit 216 stores the information related to the virtual machine as the transmission source of the received hypercall, so that the processing can be executed without calling the type determining unit 212 when the hypercall is transmitted again from the same virtual machine.

When the information related to the virtual machine as the transmission source of the hypercall determined by the processing switching unit 215 is not stored in the virtual machine management information 232 (NO in S23), the notification transmitting unit 217 may issue the error notification to the virtual machine as the transmission source of the hypercall.

Referring back to FIG. 17, the type determining unit 212 or the processing switching unit 215 transmits the type of the virtualization software that can execute the received hypercall to the type converting unit (S27). Then, the type converting unit 213 refers to the notification conversion information 233 for example, and converts the received hypercall into the hypercall in a format executable by the virtualization software 4B, as in the first embodiment (S28). The processing executing unit 214 executes processing based on the content of the hypercall obtained by the conversion by the type converting unit 213, as in the first embodiment (S29).

FIG. 18 is a diagram illustrating a specific example of the notification conversion processing in the second embodiment. As illustrated in FIG. 18, for example, when the notification receiving unit 211 receives the hypercall transmitted by the virtual machine 3D (S21), the processing switching unit 215 first executes the processing. More specifically, the processing switching unit 215 refers to the virtual machine management information 232 as described above, and determines whether the information, related to the virtual machine 3C as the virtual machine as the transmission source of the hypercall, is stored (S22 and S23). When the information related to the virtual machine 3D is stored in the virtual machine management information 232 (YES in S23), the processing switching unit 215 transmits, without calling the type determining unit 212, the type of the virtualization software that can execute the hypercall to the type converting unit 213. When the information related to the virtual machine 3D is not stored in the virtual machine management information 232 (NO in S23), the processing switching unit 215 causes the type determining unit 212 to execute the processing of determining the type of the virtualization software as in the first embodiment (S24). A specific example of the virtual machine management information 232 is described below.

FIG. 19 illustrates a specific example of the virtual machine management information 232. The virtual machine management information 232 illustrated in FIG. 19 includes, as items, "ID" indicating the virtual machine as the transmission source of the hypercall, "the number of CPUs" indicating the number of virtual CPUs allocated to each virtual machine, and "memory capacity (GB)" indicating the memory capacity allocated to each virtual machine. The virtual machine management information 232 illustrated in FIG. 19 includes, as items, "disk capacity (GB)" indicating the disk capacity allocated to each virtual machine and "type" indicating the type of the virtualization software that can execute the hypercall transmitted by each virtual machine. In the example illustrated in FIG. 19, "type" corresponding to the virtual machine with 1 as "ID" is HV-B, and "type" corresponding to the virtual machine with 3 as "ID" is HV-A. In the example illustrated in FIG. 19, no "type" corresponding to the virtual machine with 2 as "ID" is currently stored.

More specifically, for example, when a terminal as the transmission source of the hypercall received by the virtualization software 4B is the virtual machine with 3 as "ID", the processing switching unit 215 acquires information on HV-A as the type of the virtualization software that can execute the received hypercall, based on the virtual machine management information 232. Specifically, in this case, the processing switching unit 215 can determine the type of the virtualization software that can execute the received hypercall without calling the type determining unit 212. When a terminal as the transmission source of the hypercall received by the virtualization software 4B is the virtual machine with 2 as "ID", because "type" is not stored, the processing switching unit 215 calls the type determining unit 212, and the type determining unit 212 determines the type of the virtualization software that can execute the received hypercall. In this case, the management information storage unit 216 stores, as the virtual machine management information 232, 2 as the ID of the terminal as the transmission source of the hypercall and the type (for example, HV-B) of the virtualization software that can execute the hypercall transmitted by the terminal as the transmission source associated with each other.

The virtual machine management information 232 in the example illustrated in FIG. 19 includes, as items, "the number of CPUs", "memory capacity", and "disk capacity" (information related to the specification of the virtual machine). Alternatively, the virtual machine management information 232 needs not to include these pieces of information.

As described above, in the second embodiment, the virtualization software 4B includes the processing switching unit 215 unlike in the first embodiment. Thus, when the information on the virtual machine as the transmission source of the received hypercall is stored in the virtual machine management information 232, the processing can be executed without calling the type determining unit 212. Thus, the processing load, imposed on the virtualization software 4B when the type determining unit 212 is called, can be reduced.

[Third Embodiment]

Figure 20:
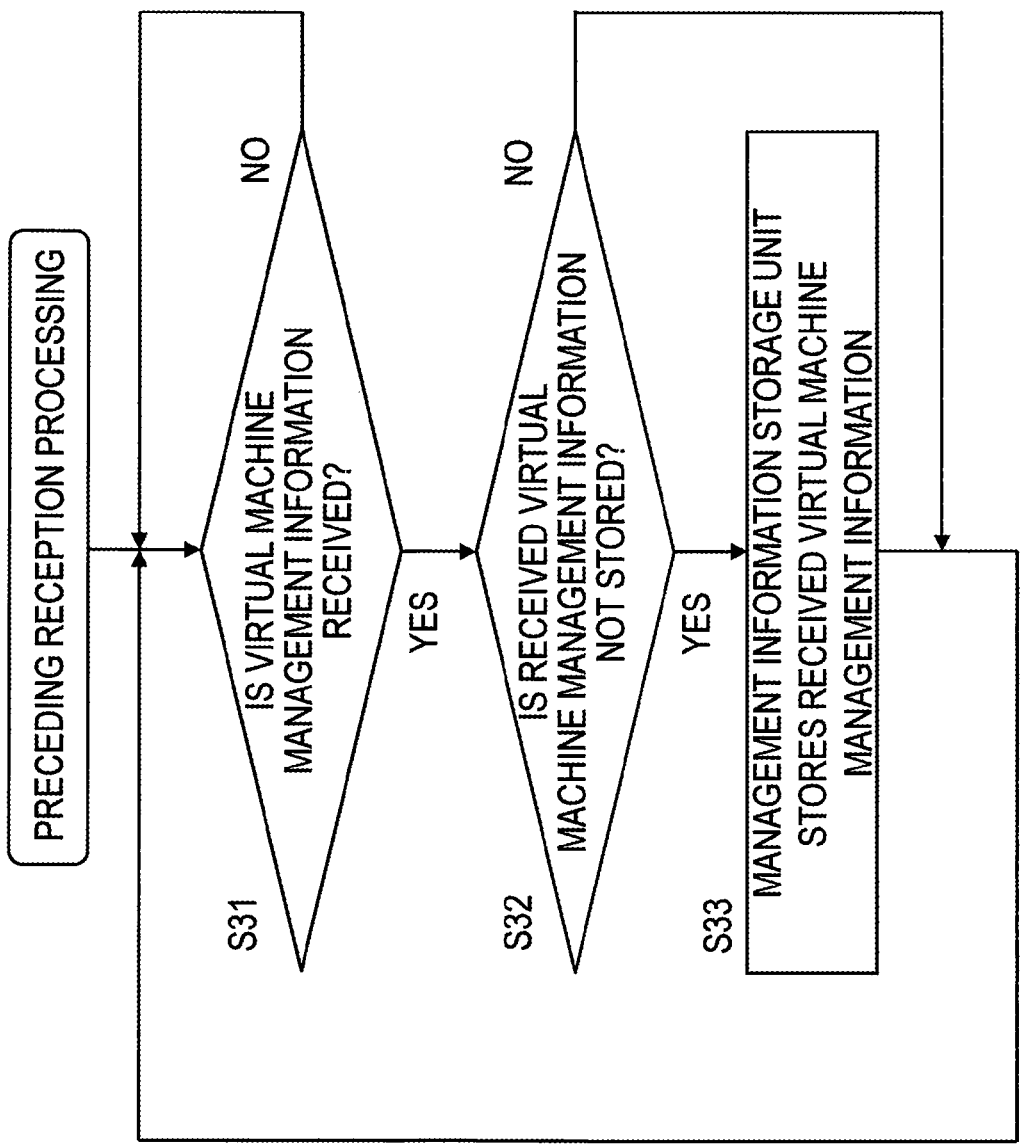
FIG. 20 is a flowchart illustrating notification conversion processing in the third embodiment.

Next, the third embodiment will be described. FIG. 20 is a flowchart illustrating notification conversion processing in the third embodiment. FIG. 21 is a diagram illustrating the notification conversion processing in the third embodiment.

In the third embodiment, the virtualization software 4B receives the virtualization management information 232 related to the virtual machine to which migration is implemented from the virtualization software and the like that manage the virtual machine as a migration source, before the migration of the virtual machine is implemented, for example. More specifically, unlike in the second embodiment, the virtualization software 4B in the third embodiment stores the virtual machine management information 232 not only when the notification receiving unit 211 receives the hypercall but also when the preceding reception unit 218 receives information from the other virtualization software and the like. Thus, the virtualization software 4B in the third embodiment can execute the processing without calling the type determining unit 212 also when the hypercall, with which the information related to the type of the virtualization software has been received, is received. Processing of receiving the information related to the type of the virtualization software in the notification conversion processing is hereinafter also referred to as preceding reception processing.

FIG. 20 is a flowchart illustrating the preceding reception processing in the third embodiment. As illustrated in FIG. 20, the preceding reception unit 218 of the virtualization software 4B waits until the virtual machine management information 232 is received for example (S31). When the virtual machine management information 232 is received from the virtualization software different from the virtualization software 4B (YES in S31), the preceding reception unit 218 determines whether the received virtual machine management information 232 is stored in the information storage area 230 (S32). When the received virtual machine management information 232 is not stored (NO in S32), the management information storage unit 216 stores the received virtual machine management information 232 based on an instruction from the preceding reception unit 218, for example (S33). Then, the virtualization software 4B waits until the notification receiving unit 211 receives the hypercall (S21 in FIG. 17), and executes the notification conversion processing in the second embodiment described with reference to FIG. 17. More specifically, when the preceding reception unit 218 receives the virtual machine management information 232, the management information storage unit 216 stores the received virtual machine management information 232. Thus, for example, the processing can be executed without calling the type determining unit 212, when the virtualization software 4B receives the hypercall from the virtual machine with the virtual machine management information 232 stored.

FIG. 21 is a diagram illustrating the notification conversion processing in the third embodiment. The virtualization software 4B in FIG. 21 includes the preceding reception unit 218, unlike the virtualization software 4B in FIG. 12.

In the example illustrated in FIG. 21, the preceding reception unit 218 receives the virtual machine management information 232 before the virtual machine is migrated for example (S31). The virtual machine management information 232 may be information related to the virtual machine scheduled to be migrated, and may be transmitted by the virtualization software managing the virtual machine. When the received virtual machine management information 232 has not been stored, the management information storage unit 216 stores the virtual machine management information 232 in the information storage area 230 as described above with reference to FIGS. 20 (S32 and S33). When the migration is executed and the notification receiving unit 211 receives the hypercall, the virtualization software 4B executes the notification conversion processing described in second embodiment. More specifically, the processing switching unit 215 executes processing by referring to the virtual machine management information 232. Thus, the processing can be executed without calling the type determining unit 212 for the hypercall received from the virtual machine related to the virtualization management information 232 received by the preceding reception unit 218.

As described above, the virtualization software 4B in the third embodiment includes the preceding reception unit 218 unlike in the second embodiment. Thus, for example, the virtualization software 4B can receive and store the virtual machine management information 232 related to the virtual machine that is scheduled to be migrated before the migration is executed (before the hypercall is transmitted from the virtual machine). Thus, the virtualization software 4B can store the virtual machine management information 232 not only when the hypercall is received, but also when the preceding reception unit 218 receives information. Thus, the virtualization software 4B can further reduce the processing load imposed on the virtualization software 4B when the type determining unit 212 is called.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a notification conversion program causing a computer to execute a process comprising:
    referring, in response to acquisition of a first notification transmitted from a first virtual machine, to a second storage unit storing therein second information in which identifying information of a virtual machine and a type of management software capable of executing a notification transmitted from a virtual machine are associated with each other;
    determining, when the second information related to the first virtual machine is not stored in the second storage unit, a type of first management software capable of executing the first notification by referring to a first storage unit storing therein first information in which a notification transmitted from a virtual machine and a type of management software capable of executing a notification transmitted from a virtual machine are associated with each other, and determining, when the second information related to the first virtual machine is stored in the second storage unit, the type of the first management software being a first hypervisor that manages the first virtual machine;
    converting the first notification into a second notification executable by second management software that has acquired the first notification, based on the determined type of the first management software, the second management software being a second hypervisor that manages a different virtual machine;
    executing the second notification obtained by the conversion;
    storing, when the second information related to the first virtual machine is not stored in the second storage unit, the second information related to the first virtual machine in the second storage unit; and
    storing, when the second information transmitted from management software, which is different from the second management software, is received and the received second information is not stored in the second storage unit, the received second information in the second storage unit.

2. The non-transitory computer-readable storage medium storing a notification conversion program according to claim 1, wherein the determining the type of the first management software includes issuing an error notification to the first virtual machine when the second information related to the first virtual machine is not stored in the second storage unit.

3. The non-transitory computer-readable storage medium storing notification conversion program according to claim 1, wherein the converting the first notification includes executing the conversion by referring to a storage unit storing therein third information in which the first notification and the second notification are associated with each other.

4. The non-transitory computer-readable storage medium storing a notification conversion program according to claim 1, wherein the converting the first notification includes performing the conversion when the first management software is unable to recognize the first notification.

5. The non-transitory computer-readable storage medium storing a notification conversion program according to claim 1, wherein the first and second notifications are each a hypervisor call for calling a function of a hypervisor.

6. A notification conversion method comprising:
referring, in response to acquisition of a first notification transmitted from a first virtual machine, to a second storage unit storing therein second information in which identifying information of a virtual machine and a type of management software capable of executing a notification transmitted from a virtual machine are associated with each other;
determining, when the second information related to the first virtual machine is not stored in the second storage unit, a type of first management software capable of executing the first notification by referring to a first storage unit storing therein first information in which a notification transmitted from a virtual machine and a type of management software capable of executing a notification transmitted from a virtual machine are associated with each other, and determining, when the second information related to the first virtual machine is stored in the second storage unit, the type of the first management software by referring to the second information, the first management software being a first hypervisor that manages the first virtual machine;
converting the first notification into a second notification executable by second management software that has acquired the first notification, based on the determined type of the first management software, the second management software being a second hypervisor that manages a different virtual machine;
executing the second notification obtained by the conversion;
storing, when the second information related to the first virtual machine is not stored in the second storage unit, the second information related to the first virtual machine in the second storage unit; and
storing, when the second information transmitted from management software, which is different from the second management software, is received and the received second information is not stored in the second storage unit, the received second information in the second storage unit.

* * * * *